US008261024B1

(12) United States Patent
Shavit et al.

(10) Patent No.: US 8,261,024 B1
(45) Date of Patent: Sep. 4, 2012

(54) ADDRESS LEVEL SYNCHRONIZATION OF SHARED DATA

(75) Inventors: Nir N. Shavit, Cambridge, MA (US); Ori Shalev, Kiron (IL)

(73) Assignee: Oracle America, Inc., Redwood City, CA (US)

( * ) Notice: Subject to any disclaimer, the term of this patent is extended or adjusted under 35 U.S.C. 154(b) by 780 days.

(21) Appl. No.: 11/263,414

(22) Filed: Oct. 31, 2005

Related U.S. Application Data

(60) Provisional application No. 60/717,562, filed on Sep. 15, 2005.

(51) Int. Cl.
G06F 12/00 (2006.01)
G06F 13/00 (2006.01)
G06F 13/28 (2006.01)

(52) U.S. Cl. ......... 711/147; 711/150; 711/152; 711/168
(58) Field of Classification Search .................. None
See application file for complete search history.

(56) References Cited

U.S. PATENT DOCUMENTS

| 5,666,523 | A | * | 9/1997 | D'Souza | 712/229 |
| 5,765,157 | A | * | 6/1998 | Lindholm et al. | 707/101 |
| 7,844,973 | B1 | * | 11/2010 | Dice | 718/108 |
| 2002/0120791 | A1 | * | 8/2002 | Somalwar et al. | 709/330 |
| 2005/0065986 | A1 | * | 3/2005 | Bixby et al. | 707/204 |
| 2006/0026183 | A1 | * | 2/2006 | Cabillic et al. | 707/100 |
| 2006/0212450 | A1 | * | 9/2006 | Earhart | 707/8 |

OTHER PUBLICATIONS

Nir Shavit and Dan Touitou, "Software Transactional Memory," Appeared in the 14th ACM Symposium on the Principles of Distributed Computing, 1995, 34 pages.

Tim Harris, "Language Support for Lightweight Transactions," ACM, 2003, 15 pages.

Maurice Herlihy, et al., "Transaction Memory: Architectural Support for Lock-Free Data Structures," Proceedings of 20th Annual Int'l Symposium on Computer Architecture, 1993, 12 pages.

* cited by examiner

*Primary Examiner* — Yaima Campos
(74) *Attorney, Agent, or Firm* — Robert C. Kowert; Meyertons, Hood, Kivlin, Kowert & Goetzel, P.C.

(57) ABSTRACT

From among a plurality of threads accessing a shared data object, one thread acquires a "master" status to arbitrate among the requests of competing threads during a given session of data access to the shared data object. During the session, the master thread resolves any conflicts resulting from attempts to access or modify the shared data object by other threads, and only the master thread may apply modifications to the shared data object during the session. Meanwhile, during the session, non-master threads may perform non-blocking read operations on the shared data object. During a subsequent session, a different thread may acquire master status.

20 Claims, 11 Drawing Sheets

ADDRESS LEVEL SYNCHRONIZATION OF SHARED DATA

PRIORITY INFORMATION

This application claims the benefit of U.S. provisional patent application Ser. No. 60/717,562, entitled "Address Level Log-Based Synchronization", filed Sep. 15, 2005, which is herein incorporated by reference in its entirety.

BACKGROUND OF THE INVENTION

1. Field of the Invention

The present invention is directed to computer systems. More particularly, it is directed to coordination mechanisms for concurrent programming in computer systems.

2. Description of the Related Art

In the field of computer systems, considerable effort has been expended on developing techniques to support concurrent access to shared resources. Mutual exclusion locks and monitors represent two traditional concurrent programming synchronization mechanisms. Locks and monitors protect shared resources by separating access to them in time; for example, in one implementation, as long as a given thread of execution retains a lock on an object or resource, no other thread of execution may modify the object, and any other thread attempting to modify the object may be blocked from further execution until the lock is released.

However, locking techniques are known to suffer from several limitations, especially in environments where the shared objects may include complex data structures. First, concurrently executing threads often access disjoint sets of memory locations within the same complex object, and locking may only really be required for the relatively infrequent occasions when two or more threads actually access the same memory locations. Typical locking mechanisms either lock the entire object (which helps to simplify programming), or implement locks of fine granularity to independently protect portions of complex objects in an attempt to increase concurrency. However, fine-grained locking techniques often result in a substantial increase in programming complexity. Second, while holding a lock, a thread may often perform numerous "ordinary" operations that do not require the lock—e.g., between any two memory access instructions that do require the lock, a large number of instructions that do not require the lock may be executed, preventing threads that are blocked on the lock from making progress. Finally, many data structures that are typically protected by locks are often accessed for read-only operations (such as method calls that do not modify any field of the data structure). The reading operations could have been making progress concurrently if it were known that no writes on the data structure were performed during their execution.

The transactional memory programming paradigm has been gaining momentum as an approach of choice for replacing locks in concurrent programming. In transactional memory programming, sequences of concurrent operations may be combined into non-blocking atomic transactions, thus making parts of the code appear to be sequential without the need to use locks. Executing threads indicate transaction boundaries, e.g., by specifying when a transaction starts and when it ends, but do not have to acquire locks on any objects. Transactional memory programming techniques may allow transactions that do not overlap in data accesses to run uninterrupted in parallel; transactions that do overlap may be aborted and retried. One stated goal of transactional memory programming techniques is to remove from the programmer the burden of understanding the interaction among concurrent operations that happen to overlap or modify the same locations in memory. However, while transactions may simplify the programmer's need to reason about concurrency, programmers still have to decide which instructions to include in a transaction. This may leave the programmer with a tradeoff similar to that of locking techniques, between the size of the transactions used and program performance: a reduction of transaction size to enhance performance may lead to added complexity in code design and verification. In addition, many current implementations of transactional memory programming are known to be inefficient, for example because of the overhead of the specific mechanisms used to implement transactions. Explicit transactions may also introduce various programming language issues and complications such as how to support nesting of transactions, I/O during transactions, etc., which may complicate transactional programming even if the transaction mechanisms were made more efficient.

SUMMARY

Various embodiments of methods and systems for address-level synchronization of shared data are disclosed. According to one embodiment, from among a plurality of threads that may access a shared data object, one thread acquires a "master" status to arbitrate among the requests of competing threads during a given session of data access to the shared data object. During the session, the master thread resolves any conflicts resulting from attempts to access or modify the shared data object by other, "non-master" threads, and only the master thread may apply modifications to the shared data object during the session (including, for example, its own modifications as well as non-conflicting modifications from other threads). Meanwhile, during the session, non-master threads may perform non-blocking read operations on the shared data object, and may thereby also make progress instead of being blocked. During a subsequent session, a different thread may acquire master status. In some embodiments, two or more versions of the shared data object may be maintained. The master may be configured to apply non-conflicting modifications to a first version of the shared data object during a session, while non-master threads may read from a stable second version that does not change during the session. The two versions may be synchronized (i.e., made identical), e.g., at the end of a session, or at the start of a new session by the current master.

According to one embodiment, the shared data object may be one of a plurality of data objects within a data structure, and concurrent accesses to each of the plurality of data objects may be managed independently. For example, in one embodiment the data objects may be member fields of an object defined within an application using a programming language such as Java™ or C++. A given master thread may arbitrate among requests directed to a particular member field during a given session, while a different master thread may arbitrate among other requests that are directed to a different member field during another session that overlaps at least partly with the given session. In contrast to some traditional schemes that employ locks or monitors at an object level, the techniques of arbitrating among competing accesses at the member field level and of allowing non-blocking reads while modifications are being made may support greater levels of concurrent access, potentially supporting higher application throughputs on multiprocessor computer systems.

In some embodiments, non-master threads may log their modifications and/or read addresses into a log accessible to the master thread, and in identifying and resolving conflicts, the master thread may be configured to access the log. The plurality of threads may all be included within a single virtual machine process (such as a Java™ virtual machine or JVM) running on a single computer system in one embodiment.

Figure 1A:
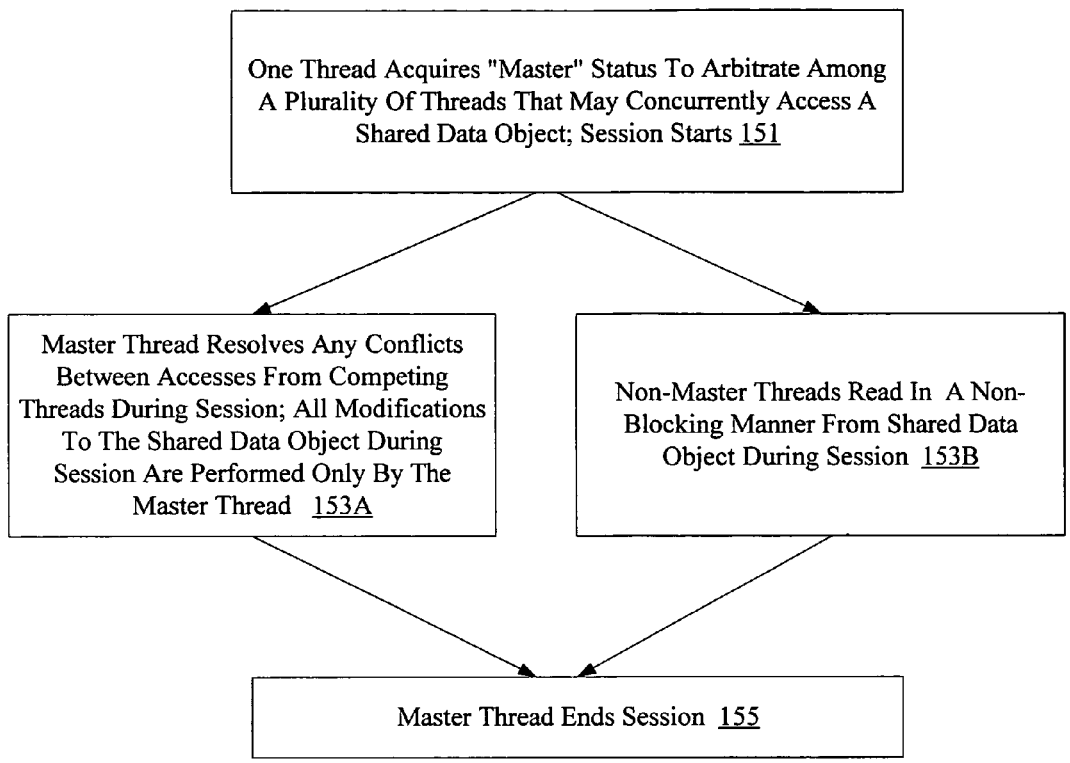
FIG. 1a is a flow diagram illustrating aspects of the operation of a mechanism for coordinating concurrent accesses to a shared data object, according to one embodiment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Figure 1B:
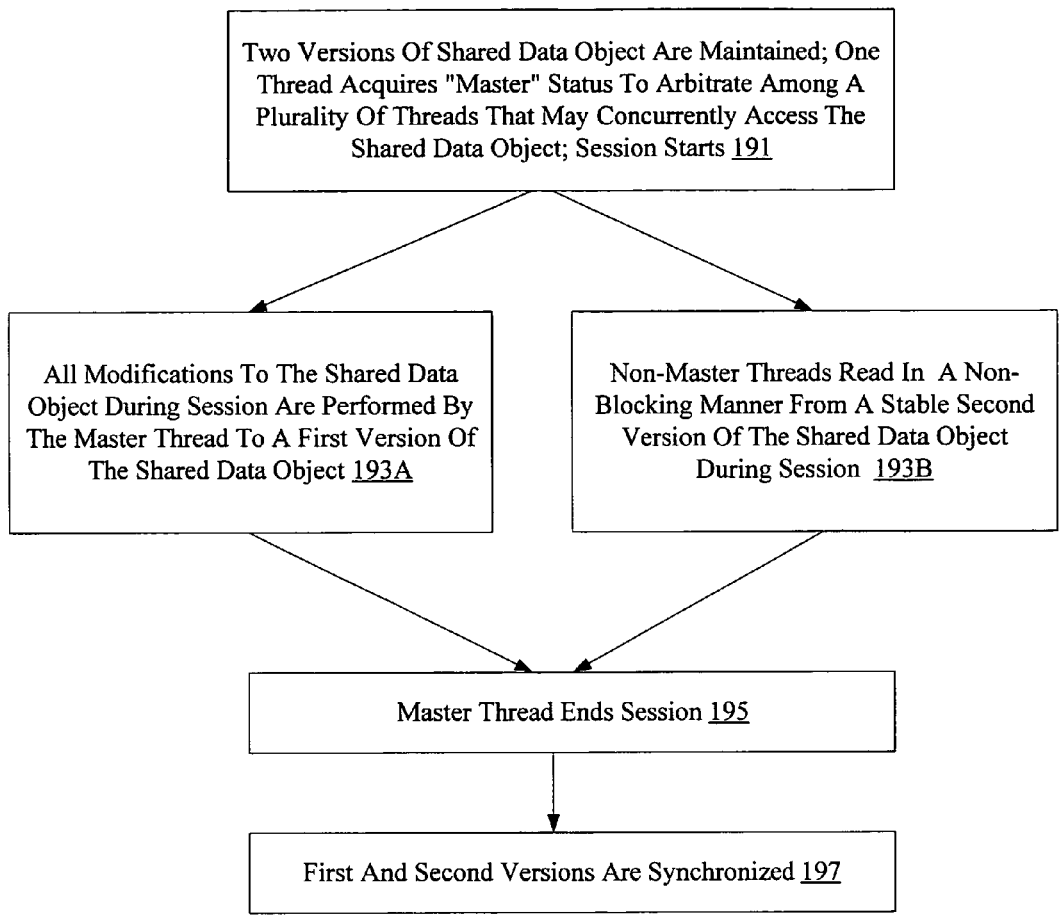
FIG. 1b is a flow diagram illustrating aspects of the operation of the mechanism for coordinating concurrent accesses, according to another embodiment.

FIG. 1a is a flow diagram illustrating aspects of the operation of a mechanism to coordinate concurrent access from multiple threads to a shared data object, according to one embodiment. In the depicted embodiment, from among a plurality of threads that may access a shared data object, one thread acquires a "master" status to arbitrate among the requests of competing threads during a given session of data access to the shared data object (block 151). During the session, the master thread resolves any conflicts resulting from attempts to access or modify the shared data object by other, "non-master" threads, and only the master thread may apply modifications to the shared data object during the session (including, for example, its own modifications as well as non-conflicting modifications from other threads) (block 153A). The same thread remains master during the entire session, resolving conflicts and performing modifications on behalf of any other threads. Meanwhile (block 153b), during the session, non-master threads may concurrently perform non-blocking read operations on the shared data object, and may thereby also make progress instead of being blocked. After the current session is ended, e.g., by the current master thread (block 155), a different thread may acquire master status during a subsequent session. FIG. 1b is a flow diagram illustrating aspects of the operation of the mechanism according to an embodiment in which two or more versions of the shared data object may be maintained (block 191). The master may be configured to apply non-conflicting modifications to a first version of the shared data object during the session (block 193A), while non-master threads may read from a stable second version that does not change during the session (block 193B). In some embodiments where more than two versions of the shared data object are maintained, different subsets of non-master threads read from different read-only versions during a given session, as described below in greater detail. The two or more versions may be synchronized (i.e., made identical), e.g., at the end of a session, or at the start of a new session, by the current master (blocks 195 and 197).

In some embodiments, the shared data object may be a subcomponent of a data structure; e.g., one thread may act as a master for a first portion of the parent data structure, while another thread may act as a master for a second portion of the same parent data structure. For example, the shared data object may be a member field of an instance of an object class defined within an application, e.g., using a programming language such as Java™ or C++. Requests to access one member field of the object may be managed by a particular master thread during a given session, while other requests to access another member field (some of which may occur while the given session is in progress) may be managed by a different master thread. Allowing different master threads to arbitrate among competing requests at a member field level, instead of managing concurrent accesses at the parent object level as in some traditional schemes employing monitors, may potentially lead to a significant increase in multiprocessor throughput in some embodiments. In other embodiments, a single master thread may arbitrate among threads competing for access to a plurality of data structures (that is, a single thread may be designated as a master thread for several data structures or data objects). In general, the object granularity at which the coordination mechanism is employed may vary in different embodiments, and even within a single embodiment. In some embodiments, the plurality of threads may all be part of the same virtual machine process, such as a Java™ virtual machine (JVM) running at a multiprocessor or uniprocessor computer host. The techniques for managing concurrent accesses described above may be implemented in various embodiments within a single computer host, requiring no network communication, in contrast to, for example, distributed database concurrency control mechanisms for managing accesses within networks of nodes. Accesses to the shared data may, for example, identify virtual memory addresses of the targeted data locations in some embodiments.

Figure 1C:
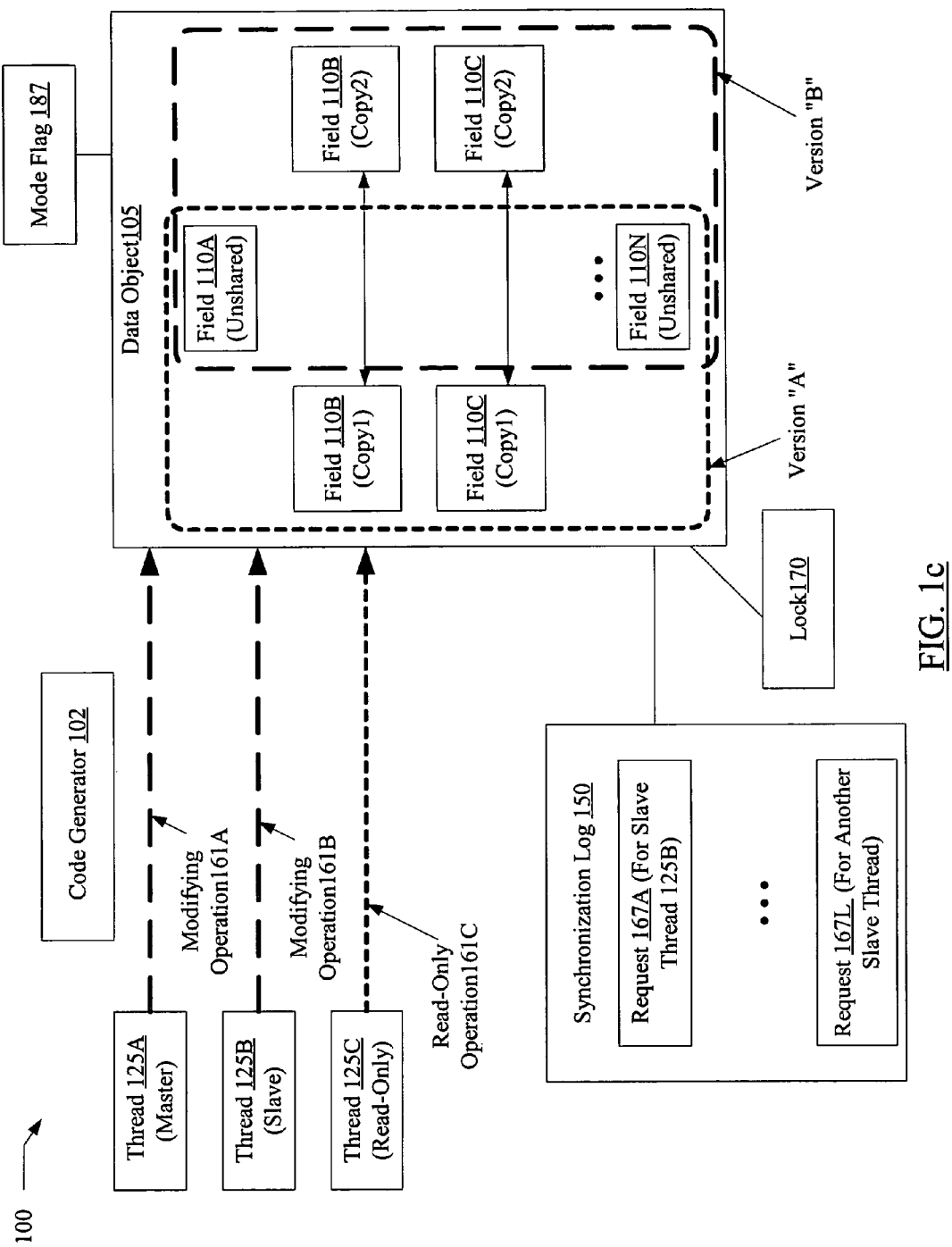
FIG. 1c is a block diagram illustrating one embodiment of a system.

FIG. 1c is a block diagram illustrating one embodiment of a system 100 in which the coordination mechanisms illustrated in FIG. 1a and FIG. 1b may be implemented. The system comprises a plurality of threads of execution 125 (e.g., threads 125A, 125B and 125C) that access a shared data object 105, and a code generator 102 configured to generate code to implement a mechanism to coordinate concurrent accesses to shared data objects such as object 105. Address-level modifications to the shared data object 105 may be coordinated through a synchronization log 150 associated with the data object. Accordingly, the coordination mechanism in the embodiment of FIG. 1a-FIG. 1c may be termed a "log synchronizer" or a "log synchronization mechanism" herein. A thread that acquires a lock 170 on the data object 105 may be configured to, in addition to performing its own data access operations on shared data object 105, arbitrate among modification requests logged by other threads in synchronization log 150, and execute a consistent set of the modification requests on shared data object 105 on behalf of the other threads, as described below in further detail. In some embodiments, while the modifications to the shared data object 105 may be protected by lock 170, the synchronization log 150 itself may not be lock-protected; e.g., atomic compare-and-swap (CAS) operations may be used to add entries to the log without acquiring a lock. In arbitrating among requests, the role played by the thread that acquires the lock may be similar in some respects to the role played by a bus in hardware transactional memory schemes. In some embodiments, the coordination of concurrent accesses may be controlled at the granularity of complete methods (e.g., methods written in an object-oriented language such as Java™) or functions: e.g., either a thread 125 successfully completes a method that modifies shared data object 105, or the entire method fails and may, for example, be retried. Methods and functions may be termed "high-level operations" herein. The term "data access operation", as used herein, refers to read and write operations that may, for example, be performed within a high-level operation. A set of data access operations within a high-level operation may in general include read operations, write operations, or both read operations and write operations. In one embodiment, for example, read and write data access operations may be specified as load and store instructions, respectively, in accordance with a particular hardware or virtual machine architecture in use at system 100.

It is noted that in some embodiments, the code generator may be omitted; e.g., in one embodiment the log synchronizer mechanism may be implemented within application programs and may require no special code generation support other than that required for typical application programs. In some embodiments, a single lock 170 may protect a plurality of shared data objects 105, while in other embodiments, a plurality of locks 170 may be used to protect respective portions or components of a single data structure or shared data object 105. Similarly, in some embodiments, a single synchronization log 150 may be used for multiple shared data objects 105, while in other embodiments, multiple synchronization logs 150 may be used to log modification requests for respective portions of a single shared data object 105.

The log synchronizer mechanism may be configured to maintain two or more versions of shared data object 105 in one embodiment, as noted above, such as versions "A" and "B" in FIG. 1c. A version may comprise a set of memory addresses to be used to access the shared data object; at a given point in time, one version may comprise a set of writeable addresses, while the other version or versions may be read-only. Each version may include a respective copy of a shared field (e.g., 110B) of data object 105; shared fields may be identified, for example, by application programmers, or automatically by a code generator or compiler 102, as described below in further detail. Unshared fields, or fields which are not modified during a high-level operation, may not be duplicated in some embodiments. Unlike in many traditional lock-based coordination mechanisms, threads 125 that do not hold the lock 170 but still need to access shared data object 105 may be permitted to make progress, e.g., by reading from a consistent read-only version "B" while version "A" is modified by the holder of lock 170. Copies of a given shared field 110 of the data object 105 may be aligned so that they reside within the same cache line in some embodiments, thus potentially reducing the number of cache misses that might otherwise occur if the different copies are accessed within a relatively short period of time. For many real-world applications where the ratio of high-level operations that modify shared data structures 105 to the high-level operations that merely read the shared data structures is high, the log synchronizer mechanism may help to increase the throughput of the read-only operations substantially, and thereby increase overall application throughput as well. Furthermore, in many real-world applications, several commonly used data structures for which high-level operations are seldom read-only (such as stacks, queues, heaps, linked lists, etc.) may often have inherent sequential bottlenecks. As a result, the level of concurrency that can be supported for modifying accesses to these commonly used data structures may be inherently limited, so delegating all modifications to a single thread at a time, as in the log synchronizer mechanism, may still support desired levels of throughput for modifying threads.

Operations on the critical path may be limited to only the address-level modifying instructions in some embodiments of the log synchronizer mechanism, and not the entire method or function. Thus, unlike in traditional locking or monitor mechanisms, if one thread holds the lock and writes to a particular field (e.g., 110B) of the shared data object during a high-level operation, a write directed to another field (e.g., 110C) of the same shared data object 105 by another thread may be successful without requiring the other thread to wait for the entire duration of the high-level operation of the lock holder. Existing lock-based code may be modified relatively easily to support parallelism and atomicity (i.e., linearizability), without allowing deadlocks to occur, using the log synchronizer technique. In addition, the log synchronizer mechanism may be implemented without requiring programmers to explicitly demarcate transaction boundaries, thereby reducing programming complexity compared to typical transactional memory mechanisms in some embodiments. It is noted that, as described below in further detail, the log synchronizer mechanism may be used in conjunction with hardware transactional memory mechanisms in some embodiments, e.g., to extend transactions to arbitrarily long method calls; thus a use of the log synchronizer may not necessarily preclude transactional memory schemes.

In addition, having a single lock-owning thread decide the outcome of modification requests to a shared data object 105 in a centralized manner, as in the log synchronizer, may require less overhead than many software transactional memory mechanisms, where for example each modifying thread must coordinate with an unknown subset of threads that dynamically overlap with it in memory. It is noted that some software transactional memory schemes may allow concurrent execution of disjoint transactions, while the equivalent operations would be executed sequentially in some embodiments of the log synchronizer mechanism. However, since the critical path in the log synchronizer mechanism may be limited to the sequence of modifying instructions, serial execution may not present as much of a problem as it would if the critical path included the entire high-level operation, as in transactional memory schemes. Furthermore, if contention does occur, both transactional mechanisms and the log synchronizer mechanism may abort transactions or high-level operations, but the locality properties (e.g., the fact that shared fields may be accessed from the same cache line) of the log synchronizer may be superior to that of many transactional mechanisms. The log synchronizer may thus provide a low-overhead, high-concurrency approach to concurrency coordination that avoids several of the problems of traditional locking and transactional memory approaches, while still being compatible with at least some transactional memory techniques. Further details on various aspects of the operation of the log synchronizer, such as how shared objects and shared fields within objects may be identified, how conflicting data access operations are managed, etc., are provided below.

In one embodiment, the threads 125 that access shared data object 105 may be designated as either "modifying" threads or "read-only" threads with respect to the shared data object 105 during a high-level operation. Some of the threads 125, such as thread 125C, may read the shared data object 105 but may not modify it during a particular high-level operation, and may be termed read-only threads with respect to shared data object 105 in the context of that high-level operation. Other threads 125, such as threads 125A and 125B, may modify shared data object 105 in addition to reading it during a high-level operation, and may be termed modifying threads with respect to data object 105 for that high-level operation. It is rioted that a thread that is designated as read-only with respect to a particular shared data object 105 during a high-level operation may modify one or more other objects, including other shared data objects, during the high-level operation (thus, the thread may not necessarily be "read-only" with respect to other objects). In addition, a given thread may be classified as read-only with respect to a shared data object 105 during one high-level operation, but may be classified as a modifying thread with respect to the same shared data object 105 during another high-level operation. Thus, the designation of a particular thread as being read-only or modifying with respect to a given shared object may only be valid in the context of a single method or function in some embodiments. It is also noted that one or more modifying threads with respect to shared data object 105 may not perform any read operations on the shared data object 105 in some embodiments; that is, some modifying threads may actually be write-only threads.

Modifying threads, such as threads 125A and 125B, may be configured to attempt to acquire lock 170 on shared data object 105 in order to perform one or more write operations 161 (e.g., write operation 161A from thread 125A, and write operation 161B from thread 125B) on the shared data object. A modifying thread (e.g., thread 125A) that acquires the lock 170 may be termed the "master" thread herein for the period during which it holds the lock, and other modifying threads whose attempts to acquire the lock fail (e.g., thread 125B) may be termed "slave" threads herein. A master thread 125A may perform data access operations on a particular version (e.g., version "A") of shared data object 105, while slave threads 125B and read-only threads 125C may be allowed to concurrently read from another version (e.g., version "B"). The particular version that is to be modified by the current master thread may be identified by a mode flag 187 associated with shared data object 105 in one embodiment. Slave thread 125B may be configured to log data access operations directed to the shared data object 105 at synchronization log 150, e.g., in a request 167A. In one embodiment, while the master thread accesses version "A", the information logged by slave thread 125B in request 167A may include the addresses and modified data values for write operations 161B directed at version "B" of shared data object 105, as well as the addresses of data locations read from version "B" by the slave thread. (As described below in further detail, the read addresses logged by slave thread 125B may be used later by master thread 125A in determining whether the slave thread's logged request 167 conflicts with other writes, since one or more write operations logged by slave thread 125B may depend on a value read from one of the read addresses.) After logging its reads and writes in request 167A, slave thread 125B may be configured to wait for a notification from master thread 125A indicating whether the logged data access operations succeeded (e.g., whether the master thread 125A performed or "applied" the modification operations logged by slave thread 125B). In one embodiment, if a thread does not read the data locations to which it writes as a slave during a given high-level operation (i.e., if it is a write-only slave thread), the thread may be configured to simply log its writes for the high-level operation in synchronization log 150 and proceed to its next high-level operation. It is noted that a thread that reads data that it has earlier modified as a "write-only" slave may have to wait to ensure that it reads the version that it modified.

The set of operations performed by a master thread such as 125A while it holds lock 170 may be termed a "session" or "data access session" herein. In an embodiment where versions "A" and "B" of shared data object 105 are maintained, a session during which the current master thread accesses and modifies version "A" may be termed an "A-Session" herein, and a session in which the current master thread accesses and modifies version "B" may be termed a "B-Session". During an A-Session, the master thread 125A may be configured to perform one or more data access operations on version "A". After performing its own data access operations, the master thread 125A may be configured to access synchronization log 150 to determine whether requests 167 have been logged therein by any waiting slave threads. If any queued requests 167 are found, master thread 125A may be configured to arbitrate among the requests to determine which of the requests should be accepted, and which requests should be rejected as conflicting. For example, in one embodiment, for each waiting slave thread's request 167, the master 125A may determine whether the read operations logged in that request conflict with a write operation (e.g., a write operation performed by the master thread during the execution of master code, or with any write operations performed on behalf of a slave thread by the master thread during the current session). If the request 167 does not conflict with a write operation, the master 125A may perform the write operations included in the request 167 on version "A", and send a success notification to the corresponding waiting slave thread. In response to the success notification, the slave thread may exit from the current method or function (thereby transitioning from its "slave" status) and proceed to perform its remaining work. In some applications where large and/or complex shared data objects 105 are common, the probability that the slave's request conflicts with another write may be relatively low, and as a result a slave thread may often be able to make progress despite not having acquired lock 170.

If the request does conflict, the master 125A may reject the request and send a failure notification to the corresponding slave thread. In response to a failure notification, in one embodiment a slave thread may be restarted: e.g., either the failure notification may itself serve as a restarting mechanism, or the slave thread may restart itself after receiving the failure notification. After restarting, eventually the restarted thread may again attempt to acquire the lock and perform its previously rejected data access operations, either as a master or again as a slave, depending on its success or failure in acquiring the lock in its latest attempt. In another embodiment, instead of restarting, the slave thread may be configured to again attempt to acquire the lock 170 and perform its rejected data access operations, e.g., either immediately or after a configurable waiting period.

Figure 2:
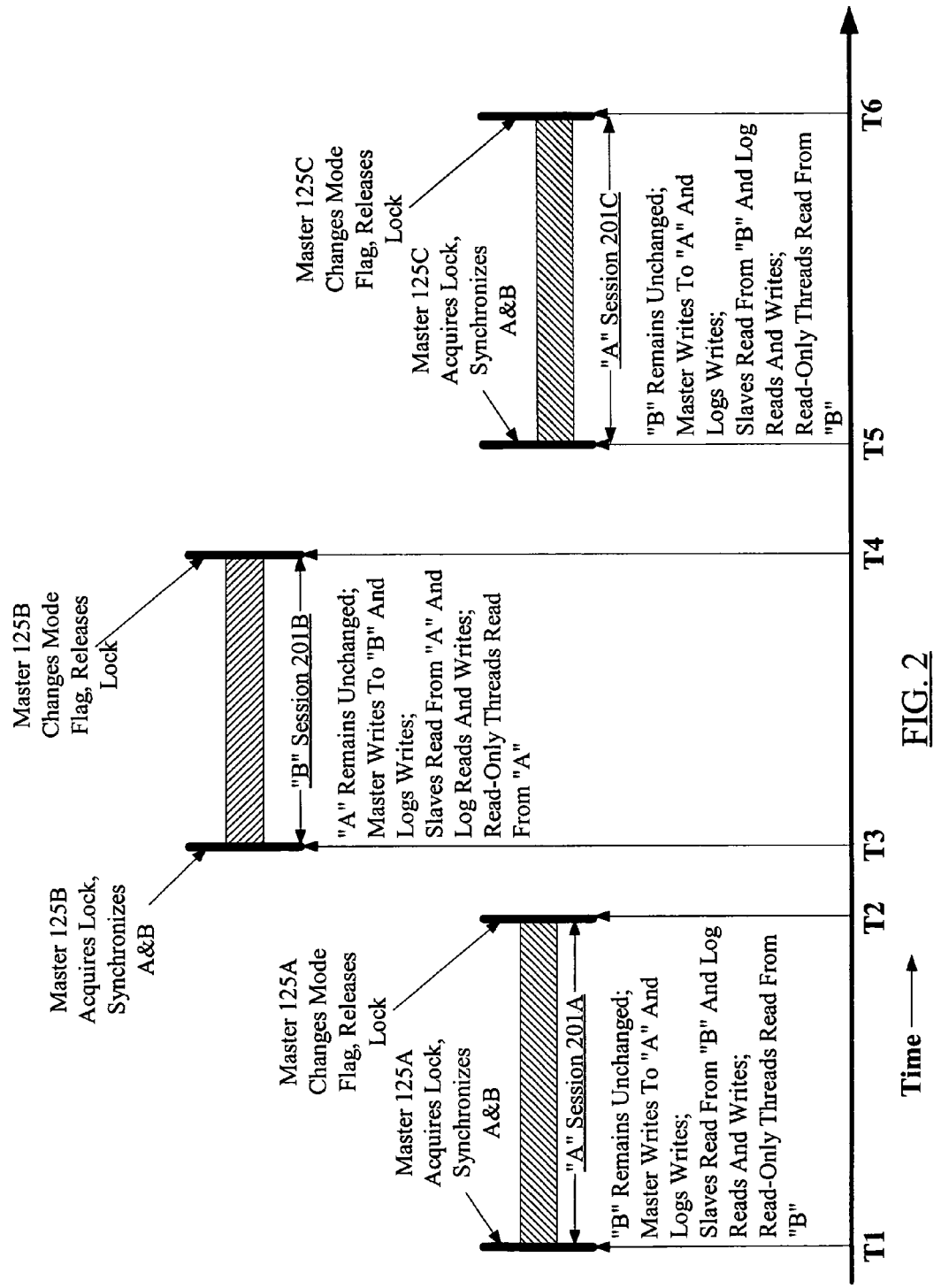
FIG. 2 illustrates a time sequence of data access sessions for a particular shared data object, according to one embodiment.

After it has dealt with the set of queued requests 167, applying any non-conflicting logged writes that it found, master thread 125A may be configured to end its current session, release the lock (thus giving up its master status) and exit from its current method or function. In some embodiments, the master thread 125A may only deal with a subset of the queued requests 167 in log 150 before ending the session. In embodiments where mode flag 187 is employed to identify the specific version of shared data object 105 that is to be accessed by a master thread, the master thread 125A may be configured to modify the mode flag at the end of the session to indicate that the next master should access a different version of shared data object 105. In one such embodiment, where for example only two versions "A" and "B" of shared data object 105 are maintained, A-Sessions may alternate with B-Sessions over time: e.g., an A-Session may be followed by a B-Session, which may in turn be followed by an A-Session, and so on, as indicated in FIG. 2 and described in further detail below. In addition to the operations performed by master thread 125A that have been described above, the master thread 125A may also be configured to perform additional operations (such as synchronizing the various versions of the shared data object by re-applying the previous master's writes to the currently-writeable version identified by the mode flag prior to performing any data accesses on the currently-writeable version, and logging master thread 125A's own write operations) during a given session, as also described below in further detail in conjunction with the description of FIG. 4a. It is noted that in embodiments where more than two versions of the shared data object are maintained, the master may re-apply writes to more than one version during the session; further details regarding operations in embodiments with more than two versions are provided below.

FIG. 2 illustrates a time sequence of data access sessions for a particular shared data object 105, according to one embodiment. In the illustrated embodiment, two versions "A" and "B" of shared data object 105 are maintained. During A-Session 201A, master thread 125A accesses and modified version "A", while version "B" remains unmodified. During an A-Session, version "B" represents a consistent state of the shared data object as of the point in time at which the immediately prior B-Session was completed. Readers of version "B" during an A-Session, such as read-only threads and slave threads, thus read a consistent version of shared data object, although the version they read may correspond to a point in the past. As shown in FIG. 2, the A-Session 201A may be initiated at time T1 by a thread 125A acquiring lock 170 and thereby assuming master status. At the start of A-Session 201A, in one embodiment, master thread 125A may be configured to determine whether any other threads 125 are currently registered as readers of shared data object 105. If any such registered reader threads are found, they may be reading version "A", which the master thread 125A now needs to modify; therefore, master thread 125A may be configured to either wait for the registered readers to unregister, or to terminate (or restart) the registered readers, before proceeding to modify version "A". (As described below, in some embodiments where more than two versions of shared data objects 105 are maintained, the master may only have to wait for (or terminate) the current readers of the one version that the master is to modify during the current session, thus potentially reducing wait times and/or the number of threads to be terminated.) After the readers have unregistered or been terminated/restarted, master thread 125A may be configured to synchronize versions "A" and "B", e.g., by applying modifications to version "A" that were logged in synchronization log 150 by the immediately previous master thread as the previous master thread modified version "B" during the immediately previous B-Session. (It is noted that while the operations of acquiring the lock and synchronizing versions are both shown as occurring at the same point in time T1 in FIG. 2 to avoid clutter, in practice some time may typically elapse between master 125A acquiring the lock and the completion of the synchronization.) After versions "A" and "B" have been synchronized, as shown in FIG. 2, in one embodiment master thread 125A may perform its own data access operations on version "A" and log its modifications in synchronization log 150. The logged information may include the addresses modified by the master (this information may be used by the master to synchronize the versions of the shared data object during the next session) in some embodiments, and in other embodiments may include both the addresses modified and the modified data values. In some embodiments, code generator 102 may be configured to replace one or more store instructions in the code for master thread 125C with a set of instructions that include additional store instructions to implement the logging, e.g., to maintain a list of the master's modifications. In one embodiment, the master thread 125A may use some mechanism other than the synchronization log 150 to record the addresses that it modifies (e.g., a local array defined within the master thread).

While master thread 125A performs its operations, including reads and writes to version "A", during A-Session 201A, one or more read-only threads 125 may attempt to read shared data object 105. The read-only threads 125 may be allowed to read version "B". For example, in one embodiment, code generator 102 may be configured to ensure that load instructions directed at shared data object 105 in the read-only threads are directed at version "B". (As described below and shown in FIG. 1c, in some embodiments only selected fields or portions of shared data object 105 may differ between versions "A" and "B", so only a few loads of a read-only thread may be affected by the duplication of shared fields 110.) Modifications performed on shared data object 105 after T1 (e.g., changes performed by master thread 125A on version "A" or logged in synchronization log 150) may not be seen by read-only threads during A-Session 201A.

In addition, one or more modifying threads 125 may attempt to acquire lock 170 during A-Session 201A. Since the lock is held by master thread 125A, any such modifying threads may be prevented from accessing version "A". However, instead of being blocked, these modifying threads may be allowed to progress as slave threads: that is, they may be configured to read from version "B" and perform any other operations (such as computations or reads/writes to other objects) that do not affect shared data object 105. The slave threads may not actually be permitted to modify any locations of shared data object 105, even of version "B", during the A-Session; rather, they may log the addresses and modified data values for write operations directed at shared data object 105 in a request 167 within synchronization log 150. In addition, the slave threads may log their read addresses (the addresses from which data was read during the read operations they actually performed on version "B") in the request 167. In one implementation, logged read addresses may be maintained in one list within a slave request 167, and write addresses and modified values may be maintained in a separate list. Modified code to implement the logging data access operations of slave threads may also be generated by code generator 102 in some embodiments. In some embodiments, for example, code generator 102 may be configured to generate multiple versions of a high-level operation's code, e.g., a slave version and a master version, and the decision as to which version is executed during a particular instance of the high-level operation may be made at run-time, depending on the result of the lock acquisition attempt.

After completing its own data access operations, master thread 125A may access synchronization log 150, determine whether any logged requests from slave threads are to be applied to version "A", and apply any such acceptable logged requests as described above. For each accepted write operation, in some implementations, an indication that the write request was accepted and applied may be saved in the synchronization log 150 (such indications may be useful to the next master thread in synchronizing versions "A" and "B"); in other implementations, rejected requests may be discarded from the synchronization log 150, so any requests that remain in the log may be assumed by the next master to have been accepted. Success notifications may be sent to slave threads whose requests were accepted, and failure notifications may be sent to slave threads whose requests were rejected. After completing processing of the queued requests it found in synchronization log 150, master thread 125A may terminate the session by changing the mode flag (to indicate that the next master thread is to access version "B") and releasing lock 170 at time T2.

When the next modifying thread, e.g., 125B, successfully acquires the lock 170 (e.g., at time T3 in FIG. 2), it becomes the new master thread and B-Session 201B is initiated. The new master 125B then performs similar operations to those performed by master 125A in A-Session 201A, except that its own accesses are directed to version "B". For example, master 125B may wait for or terminate any registered readers of version "B" and once again synchronize "A" and "B" by applying modifications logged (for version "A") in the synchronization log 150 to version "B". It is noted that in the exemplary time sequence of FIG. 2, "B" remains unchanged not just between T1 and T2, but actually between T1 and T3 (when master 125B synchronizes versions "A" and "B"). Any read-only threads or slaves reading from "B" between T1 and T3 thus do not see any changes to version "B" that occurred or were requested after T1. Of course, if the number of modifying threads for shared data object 105 is high, or if any slaves requests were rejected by master 125A during A-Session 201A (resulting in a repeat attempt to acquire the lock 170 by the rejected slave), there may not be a significant delay between T2 and T3: that is, as soon as one master releases lock 170, a next master may acquire lock 170. After "A" and "B" are synchronized by master thread 125B, master thread 125B may perform its own logging data accesses on version "B", and then access synchronization log 150 to accept or reject queued slave requests that may have accumulated during B-Session 201B.

Version "A" may remain unmodified during B-Session 201B, and read-only threads that register to read shared data object 105 during B-Session 201B may access version "A". Any slave threads that attempted to acquire lock 170 after T3 may also read from "A", and log their reads and writes to synchronization log 150 as described above. After it has processed queued slave requests, master 125B may modify mode flag 187 to indicate that the next master should access version "A", release lock 170 and exit from its high-level operation, e.g., at time T4. The next time a modifying thread (e.g., 125C) acquires lock 170, the next A-Session may be initiated, e.g., at time T5. The cycle of A-Sessions followed by B-Sessions may continue as long as the application in which shared data object 105 is defined continues to be executed, and as long as modifying threads attempt to acquire lock 170 to access shared data object 105. It is noted that successive sessions may represent executions of different methods in some embodiments: e.g., A-Session 201A may represent one method, B-Session 201B may represent another method, and A-Session 201C may represent a third method. In other embodiments, two or more of the sessions may represent different invocations of the same method by the same master thread or by different master threads.

As shown in FIG. 1c, two or more versions, such as versions "A" and "B", of shared data object 105 may be maintained in some embodiments. In one embodiment, the entire shared data object 105 may be replicated for each version. In some embodiments, however, some portions of shared data object 105 may be common to all versions, while other portions (e.g., portions that are programmer-identified or predicted to be shared by multiple threads) may be replicated in each version. In the embodiment illustrated in FIG. 1c, for example, shared data object 105 comprises a plurality of fields 110, such as fields 110A, 110B, 110C, . . . 110N. Version "A" comprises field 110A, field 110N, a first copy of field 110B and a first copy of field 110C. Version "B" comprises field 110A, field 110N, a second copy of field 110B and a second copy of field 110C. In such embodiments, rather than duplicating all the locations within a data object to support the low overhead reading by slave threads and read-only threads as described above, only a subset of the locations may be duplicated. The portions or fields that are to be duplicated may be identified by code generator 102 using a variety of techniques in different embodiments. For example, in some embodiments, a programming language declaration modifier may be used to explicitly identify shared fields within an object. In one embodiment, specially formatted notations or comments within source code may identify objects as shared. In other embodiments, a code generator 102 such as a compiler may be configured to conservatively predict which objects and/or locations are shared by method calls. While such a conservative technique may not be optimal (e.g., it may overestimate the number of fields that may be shared, and therefore duplicate more data than strictly necessary), it may reduce the burden on programmers and support shorter time to deployment in certain implementations. A combination of explicit (e.g., programmer-specified) and automated (e.g., compiler-initiated) identification of shared portions of objects may be used in some embodiments.

Figure 3:
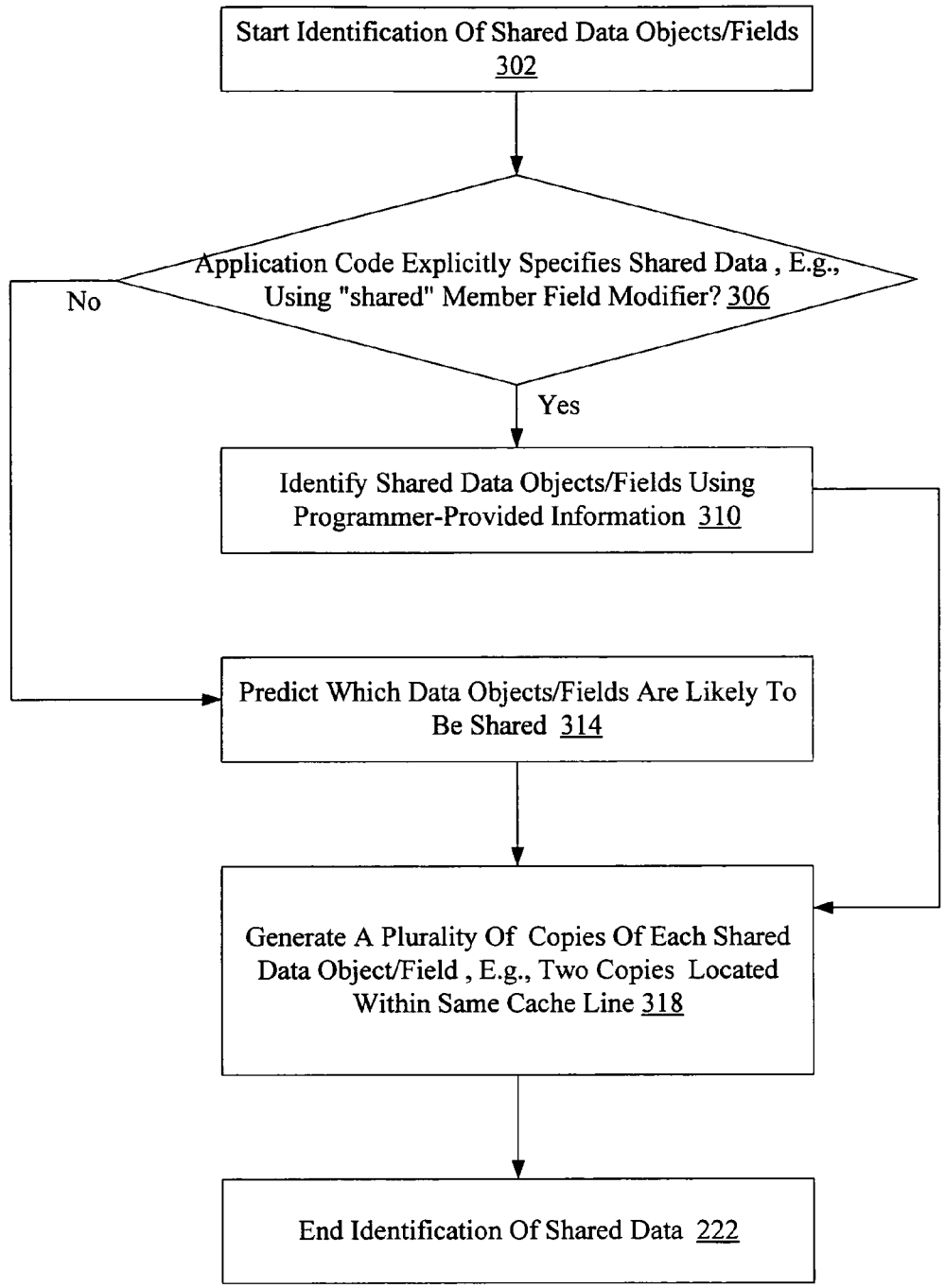
FIG. 3 is a flow diagram illustrating aspects of the operation of a code generator, according to one embodiment.

FIG. 3 is a flow diagram illustrating aspects of the operation of code generator 102, according to one embodiment. In block 302, the code generator may be configured to begin identifying shared data fields or object portions, e.g., at the time the code for an application is compiled. If the application explicitly specifies which data is to be shared, e.g., using a declaration modifier such as "shared" or via programmer-supplied comments or notations, as detected in decision block 306, the code generator 102 may be configured to identify the shared fields/portions using the programmer-specified information (block 310). If the application does not specify which data is to be shared, the code generator 102 may be configured to predict the fields or portions of the data object that are likely to be shared (block 314). For each field identified as being shared or as being likely to be shared, the code generator may be configured to generate a plurality of copies. For example, in one embodiment the code generator may be configured to allocate enough storage to store two copies, and to align each copy so that both copies would occupy in the same cache line within a hardware cache (e.g., a Level 1, Level 2, or Level 3 cache) at a targeted system (block 318). In addition to generating the copies, in some embodiments the code generator 102 may also be configured to augment load and store instructions accessing the shared locations to implement the log synchronizer mechanism described above: e.g., to add instructions to log read addresses, write addresses, and modified versions of the data fields, depending on whether a lock was acquired. After all the shared portions of the data object have been identified and replicated, the code generator may exit the process of identifying shared locations (block 322). In some embodiments where the programming language in use supports shared field identification mechanisms such as modifiers or notations, both programmer-specified information and code generator predictions may be used to identify shared locations: e.g., the code generator may determine that a particular field is to be shared even in the absence of programmer-supplied information identifying the field as shared. In some embodiments, code generator 102 may be configured to examine an already compiled application, and to insert or substitute a modified version of portions of the application code to implement the log synchronization mechanism (or to improve an existing version of the log synchronization mechanism). That is, the log synchronization mechanism may be applied retroactively (i.e., after an initial compilation), or in multiple steps, to a particular application in some embodiments.

In some embodiments, a programming language being used in system 100 may support one or more method or function modifiers to identify those methods for which log synchronization is to be implemented. In other embodiments, code generator 102 may be configured to predict which methods (and/or objects 105) are to participate in the log synchronization mechanism. In one embodiment, for example, the Java™ programming language may be extended to support the use of a method modifier such as "logsynchronized" to specify which methods are to use log synchronization, and to support the use of a member field modifier such as "shared" to identify object fields that are to be shared using the log synchronizer mechanism. The following code provides an example of the use of such modifiers in implementing a stack

```
1 class Stack {
2 shared ListNode head=null;
3 class ListNode {
4 public int value;
5 shared public ListNode next;
6 }
7 public logsynchronized void push (int newval) {
8 ListNode newNode=new ListNode(newval,head);
9 head=newNode;
11 public logsynchronized int pop( ){
12 int val=head.value;
13 head=head.next;
14 return val;
15 }
16 }
```

As shown, the modifier "logsynchronized" indicates that the methods push( ) and pop( )are to use the log synchronizer mechanism, and the modifier "shared" indicates that fields head (of Stack objects) and next (of ListNode objects) are to be shared.

Figure 4A:
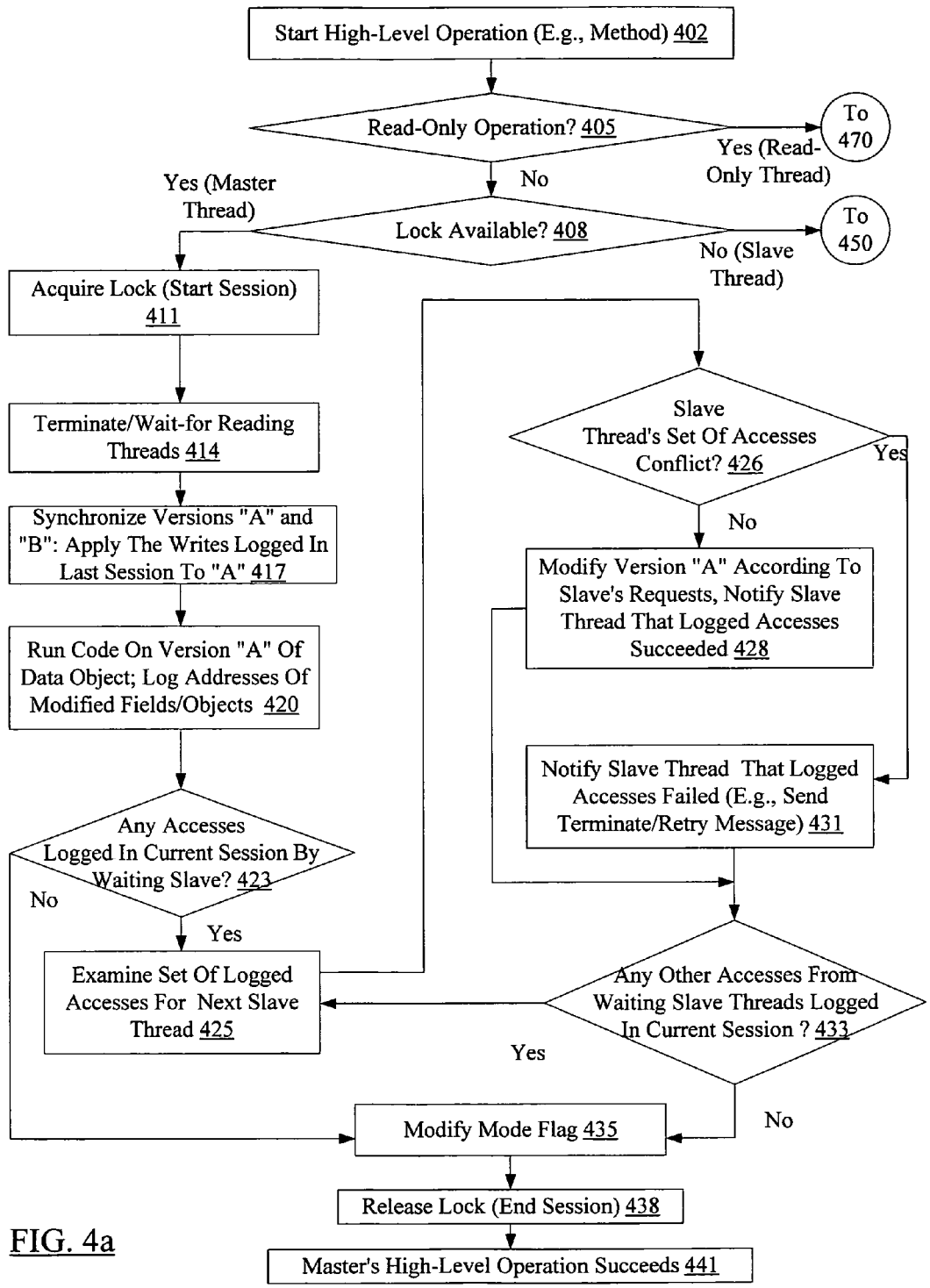
FIG. 4a-4c are flow diagrams illustrating aspects of the operation of a log-synchronizer mechanism during a high-level operation that includes accesses to a shared data object, according to one embodiment.
Figure 4B:
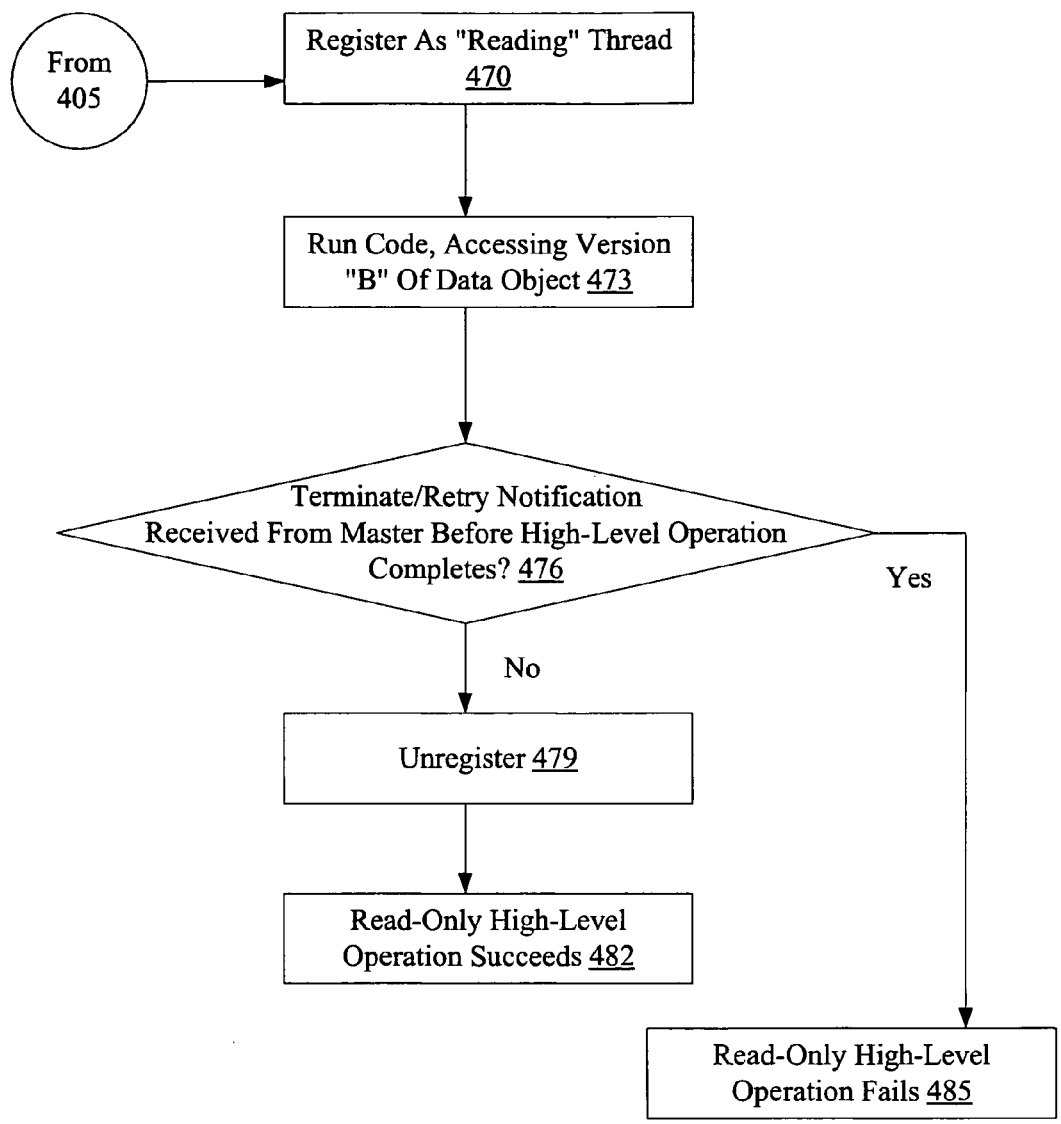
Figure 4C:
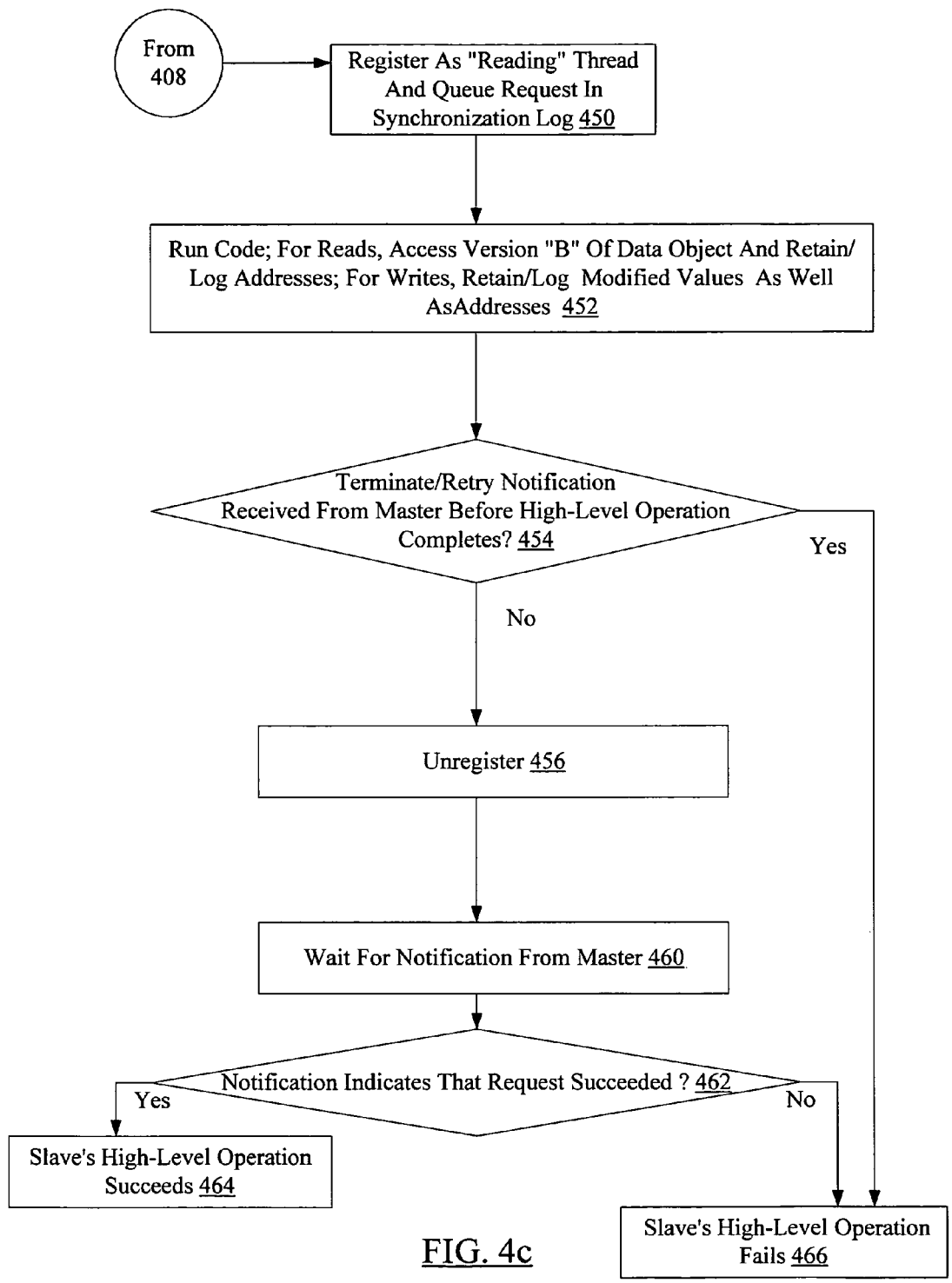

FIG. 4a-4c are flow diagrams illustrating aspects of the operation of a log-synchronizer mechanism during a high-level operation that includes accesses to a shared data object 105, according to one embodiment. A thread 125 enters the high-level operation at block 402. The set of operations performed by the thread during the high-level operation differ, depending on whether or not the thread 125 modifies the shared data object 105, and if the thread is a modifying thread, whether the thread acquires the lock 170 on the shared data object 105 (and becomes a master thread) or not (in which case the thread becomes a slave thread). If the thread 125 modifies the shared data object 105 (as detected in decision block 405), the thread 125 attempts to acquire lock 170. If the lock is not available, i.e., if the lock is already held by a current master thread, the thread 125 may assume the role of a slave thread, and perform the slave thread operations illustrated in FIG. 4c, as indicated by the circle labeled "To 450" in FIG. 4a. If the thread that entered the high-level operation at block 402 acquires the lock (block 411), it assumes the role of a master thread and a new master session starts; operations performed by the master during the session are illustrated in FIG. 4a. If the thread 125 does not modify the shared data object, it performs the operations corresponding to a read-only thread shown in FIG. 4b, as indicated by the circle labeled "To 470" in FIG. 4a. The determination as to whether a method modifies the shared data object (and therefore, that a thread 125 invoking the method should perform the read-only thread operations shown in FIG. 4b, and not the master or slave operations) may be made in some embodiments at compile time, e.g., by code generator or compiler 102.

In some embodiments, code generator 102 may be configured to generate different versions (e.g., master and slave versions) of the code for modifying methods that utilize the log synchronizer, and the decision as to which version of the code is to be executed for a given method invocation may be made at run time, e.g., based on the success or failure of a given modifying thread in acquiring lock 170. In one implementation, code generator 102 may be configured to augment a store instruction corresponding to a write operation in the original version of the method with a short set of instructions which add the address of the data location that is being modified within shared data object 105 to a master's list in the synchronization log 150. In another implementation, both the address and the modified data value corresponding to the store may be added to the master list. In the slave version of the code, loads (corresponding to read operations) and stores (corresponding to write operations) may each be replaced by short sets of instructions that add to the log the addresses read and the addresses and data to-be-written in one embodiment. The slave read information and slave write information may be maintained in separate lists within a request 167 in some embodiments. It is noted that all the entries in a slave request 167 may not be stored physically contiguously within synchronization log 150 in some embodiments; instead, for example, an identifier indicating the thread 125 or request 167 to which an entry belongs may be stored along with the entry, so that the log entries for a given slave thread 125 are logically linked to one another without being physically contiguous. In other embodiments, the entries of given thread request 167 may be stored physically contiguously in synchronization log 150.

In some embodiments, code generator 102 may also be configured to generate modified version of read-only methods that access shared data objects 105 that are protected using log synchronization, e.g., to ensure that read-only threads access the version of the shared data object (e.g., version "B" in the case of an A-Session) that is currently not being modified by a master thread. In other embodiments, threads may be directed to the appropriate copy of shared fields (such as fields 110B and 110C of FIG. 1c) by applying a bias to the addresses of data access operations at run time, based on the status of the thread and the current type of session—e.g., during an A-Session, loads of slaves and read-only threads may be directed to addresses within version "B", while loads/stores of the master may be directed to addresses within version "A". In embodiments where dynamic address biasing or run-time address modification is used, additional overhead may be required to compute the correct addresses for loads and stores at run time (although at least some of the overhead of maintaining separate compiled versions of code may be avoided). It is noted that in embodiments where the copies of shared fields of shared data objects are aligned in such a way that the copies reside within the same cache line, cache miss penalties may be avoided despite the use of multiple copies: e.g., master, slave and read-only threads may all access the shared field from the same cache line.

FIG. 4a illustrates operations performed by a master thread 125A in an A-Session in an embodiment where "A" and "B" versions of shared data object 105 are maintained, and a mode flag 187 is used to indicate which version is currently in use by the master thread. (During a B-Session, operations similar to those shown in FIG. 4a would be performed by the master thread, except that the operations of the master would be directed to version "B". Similarly, during a B-Session, operations similar to those shown in FIGS. 4b and 4c would be performed by a read-only thread and a slave thread, respectively, except that their operations would be directed to version "A".) The acquisition of lock 170 in block 411 starts the A-Session. Before performing its own data accesses on version "A" of shared data object, the master thread 125A may perform two sets of operations in the embodiment illustrated in FIG. 4a: first, as shown in block 414, it may deal with any threads that may be currently reading version "A", and second (block 417), it may synchronize versions "A" and "B" (i.e., make version "A" identical to version "B").

As described below in conjunction with the descriptions of FIG. 4b and FIG. 4c, in some embodiments a reader registration mechanism may be implemented for shared data objects 105. Prior to accessing the shared data object 105 during a high-level operation, a read-only thread may be configured to register as a reader of the object, and after completing the read operations of the high-level operation, the read-only thread may unregister as a reader. Similarly, slave threads may also be configured to register themselves as readers and unregister after they have completed their reads (and logged their reads and writes). The registration mechanism may be used, for example, to ensure that the current master does not overwrite a version that is currently being read by a slave or a read-only thread—e.g., during an A-Session, before synchronizing the "A" version, the current master may be configured to ensure that no registered readers of version "A" remain active. In some embodiments, the master thread may determine whether to wait for a registered reader to complete its read operations and voluntarily unregister, to terminate/abort one or more registered readers (and thereby force unregistration), or to send a message or signal that interrupts the registered reader thread (e.g., by causing an exception to be thrown) to indicate to the reading thread that it should voluntarily unregister as soon as possible. The specific technique selected to ensure that no registered readers of version "A" remain when the master begins modifying "A" may be configurable or based on one or more heuristics in different embodiments, and may depend on the facilities supported by an operating system in use (e.g., some operating systems and/or virtual machine implementations may support terminate operations directed to one thread by another, while other operating systems and virtual machines may not). In embodiments where terminate mechanisms are available, the use of the terminate mechanisms may in general be more effective than waiting for the registered readers to voluntarily unregister; e.g., higher overall throughput may be obtained by using terminate mechanisms. In some embodiments, a combination of techniques may be used in the terminate/wait for operations illustrated in block 414: some registered readers may be waited for (e.g., based on thread priority), while others may be terminated. Registration may be implemented using a variety of techniques in different embodiments: e.g., in one embodiment, a reader thread (e.g., a read-only thread or a slave thread) may register itself by inserting an entry into a global structure. In some embodiments, registration may be implemented with minimum synchronization overhead if each registered thread maintains an element in a linked list, exposing its status, as described below in further detail. In one embodiment, reader registration information may be stored within synchronization log 150. Threads inactive for a relatively long time may be removed from the set of registered readers to avoid unnecessary work by the master in iterating the list in one embodiment.

When no more registered readers remain, master thread 125A may be configured to synchronize versions "A" and "B" (block 417 of FIG. 4a), e.g., by atomically applying to version "A" the modifications made to version "B" during the previous B-Session and logged in synchronization log 150 by the previous master thread. (It is noted that in some embodiments where only a portion of the shared data object is duplicated in the different versions, at most those duplicated portions of the shared data object may need to be synchronized).

After the versions have been synchronized, master thread 125A may perform its own data access operations on version "A" (block 420) in the embodiment depicted in FIG. 4a. As noted above, in one embodiment the store instructions of the method may be augmented/replaced by different sets of instructions for master and slave threads. Masters may log their stores so that they can be applied to the other version (for synchronization during the next session). In one embodiment, the master's logging may be implemented by augmenting each store instruction with two additional instructions: one store instruction that writes the targeted address in a local array, and one register increment instruction that updates the array size. In such an embodiment, the slave's logging may be implemented by replacing each store instruction by two stores to a local array, saving the address and the modified value, followed by a register array increment instruction. Slave loads may be augmented by one store in a local array (storing the address only) and an array increment instruction in such an embodiment. In some embodiments, local arrays of a certain size may be pre-allocated for the logged information, and the pre-allocated arrays may suffice for most high-level operations. It is noted that supporting an unlimited number of loads and stores may not necessarily involve a branch on every increment; for example, in one embodiment an operating system's memory management mechanism may be used to detect array overflows. It is also noted that for read-only threads in such embodiments, load instructions may not need to be augmented with additional instructions: when a read-only thread completes without being interrupted, the data read by it may be guaranteed to be consistent.

After the master thread 125A completes its own data accesses, the master thread may be configured to examine the synchronization log 150 to determine whether the log contains any logged requests 167 from waiting slave threads (block 423 of FIG. 4a). If any requests 167 are found, in one embodiment the master thread 125A may process the requests 167 in the order in which the requests were queued, evaluating for each request 167 whether it can be applied to version "A" (i.e., whether the request 167 does not conflict with a previous write). The master thread may examine the set of logged operations for the next slave thread (block 425), and determine whether that slave's operations conflict (block 426). In one embodiment, a conflict may be detected if any of the memory locations read by the slave were modified by the master while executing the master's own code (e.g., in block 420) or when applying preceding slave requests. For example, if the master thread 125A finds three requests 167B, 167C and 167D queued in order by waiting slave threads 125B, 125C and 125D, respectively, the master may first compare the data in the two versions "A" and "B" at the read addresses logged in request 167B, and determine that request 167B conflicts with the master's modifications if the two versions differ at any of the read addresses. If request 167B is found to be acceptable, its modifications may be applied, and the read addresses in request 167C may be similarly checked for conflicts with writes of the master and those of request 167B. If 167C is also determined to be acceptable, the writes of 167C may also be applied, and the reads of 167D may be checked for conflicts with the cumulative writes of the master, 167B, and 167C to determine whether 167D is acceptable. In some embodiments, techniques other than comparing data at the read addresses in "A" and "B" may be used to determine whether a request 167 conflicts with previously-applied writes: e.g., write addresses of previous writes may be compared to read addresses in the requests using a hash table, and a conflict may be found if any read address matches or overlaps with a previous write address. By processing the requests of waiting slave threads in the order in which they were queued, master 125A may ensure that slaves that began queuing their requests earlier have a better chance of having their requests accepted. In some embodiments, master thread 125A may instead be configured to process queued requests in a different order (e.g., based on thread priority), instead of the order in which they were queued.

It is noted that in one embodiment, the master thread may be configured to logically "freeze" the synchronization log before it begins processing slave requests: e.g., in order to limit the amount of work that the master may have to do before it exits the high-level operation, the master may be configured to only process those requests 167 that were queued by slave threads that have already unregistered as readers when the master completes its own code (block 420). In such an embodiment, the master may be configured to ignore or terminate slave threads that unregister while the master is iterating over queued slave requests.

If the slave's request is found to be unacceptable (e.g., if a conflict is identified as described above), the master thread 125A may be configured to send the slave a failure notification, such as a signal to terminate the slave or an indication that the slave should retry its data accesses (block 431). If the slave's request is found to be acceptable (i.e., if no conflict is detected), the slave's logged modifications may be applied by the master to version "A" (block 428). In some embodiments, the master may be configured to log the addresses modified on behalf of the slave (e.g., so that all the changes made to version "A" during the A-Session may be applied to version "B" during the next B-Session). After a waiting slave's request is processed and the slave is notified, if any other waiting slave's request remain in the log (as detected in block 433), the operations corresponding to blocks 425, 425, 428, and 431 may be repeated for the next waiting slave request. In some embodiments, the master thread 125A may be configured to delete each request 167 from log 150 after the request has been processed; in other embodiments, the slave threads may instead be responsible for deleting their requests. In some implementations, requests 167 may not be deleted from log 150; instead, old requests that have been processed may be overwritten as needed.

When all the slave requests have been processed, the master thread 125A may be configured to modify the contents of mode flag 187 (block 435), e.g., to indicate that the next master thread (if any) should modify version "B". The master thread may then release the lock 170 (block 438) and successfully exit from the high-level operation (block 441). It is noted that in the embodiment depicted in FIG. 4a, once a thread achieves master status for a given high-level operation accessing shared data object 105, it may be guaranteed to terminate the high-level operation successfully (at least with respect to possible terminations caused by contention for shared data object 105): none of the slaves or read-only threads are allowed to terminate the master, although the master may terminate one or more slaves or read-only threads. Accordingly, in some embodiments, threads that repeatedly fail to acquire lock 170 may enter a "master-only" mode of operation in which they no longer accept slave status. In some embodiments, during such a "master-only" mode of operation, threads may simply block if they fail to get a lock. In one implementation, master-only threads may register themselves at a registry to indicate their master-only status. Special treatment (e.g., higher priority in acquiring lock 170) may be given to master-only threads in some embodiments to ensure that they make progress.

FIG. 4b illustrates operations performed by a read-only thread, e.g., thread 125C of FIG. 1c, during the A-Session corresponding to the master thread 125A's operations depicted in FIG. 4a, according to one embodiment. As shown in block 470 of FIG. 4b, the read-only thread may be configured to register as a reader of shared data object 105, e.g., using one of the registration techniques described above. After registering itself, the read-only thread may run its code (block 473), reading from version "B" of shared data object 105, which remains unchanged during the A-Session as indicated above and shown in FIG. 2. In some embodiments, a modified version of compiled code for the high-level read-only operation may be run, in which the addresses of some load instructions may be adjusted to point to the correct version of shared data object 105 based on the current setting of the mode flag 187, while in other embodiments, the load addresses may be dynamically biased or adjusted at run-time to access the correct version. While the addresses read by the load instructions may be adjusted, additional instructions may not need to be inserted into the code for the accesses to shared data object 105 by read-only threads (unlike slave threads and master threads, which may need to insert information into synchronization log 150, read-only threads may not participate in logging). As noted above, in some embodiments a master thread 125A may be configured to send a termination signal or a retry request to currently active read-only threads (e.g., in the operations corresponding to block 414 of FIG. 4a). Such signals/requests may be received at any time during the period when the read-only thread is registered. If any such signal or request is received by the read-only thread 125C (decision block 476), the read-only high-level operation fails (block 485), and the read-only thread may be restarted in some embodiments. In some embodiments, the master thread may actively terminate the read-only thread, while in other embodiments the master thread may send a message to the read-only thread requesting that the read-only thread unregister as a reader and potentially restart its data access operations on shared data object 105. If no termination/restart signals or messages are received, the read-only thread may complete its reads on the appropriate version (version "B" in FIG. 4b) of the shared data object 105, unregister as a reader (block 479). Having successfully completed its high-level operation (block 482), the read-only thread may exit from the high-level operation and proceed to any other high-level operations it may need to execute.

FIG. 4c illustrates operations performed by a slave thread, e.g., thread 125B of FIG. 1c, during the A-Session corresponding to the master thread 125A's operations depicted in FIG. 4a, according to one embodiment. (In the depicted embodiment, slave threads are assumed to both read and modify shared data object 105; it is noted that in cases where a slave thread does not read shared data object 105 but only modifies it, the operations of the slave thread may differ slightly from those shown in FIG. 4c.) The request may be initially empty in some embodiments, and may serve as a place-holder into which data accesses are later logged by the slave thread. The slave thread 125B may be configured to register as a reader of shared data object 105, and may also be configured to queue or initialize a request 167 in synchronization log 150 before it starts data access operations on the shared data object 105 (block 450 of FIG. 4c). Having registered, the slave thread may be configured to run its code for the high-level operation (block 452). The slave thread may read from version "B" of the shared data object, which remains consistent and unchanged during the A-Session as discussed above, and may be configured to log the addresses from which it reads. For writes directed at data object 105, the slave may be configured to log the addresses of the writes as well as the modified version of the .data. In some embodiments, the logged information may be retained, e.g., in a local buffer, by the slave thread, and added to the synchronization after the slave completes its data accesses and is about to unregister as a reader. In other embodiments, the slave thread may write the logged information into its request 167 within synchronization log 150 as soon as the corresponding load operation is performed on version "B" (for reads), or as soon as the store operation is encountered in its code (for writes). In some embodiments, separate lists of read-related logging information and write-related slave information may be maintained for each slave request 167 in synchronization log 150, e.g., allowing the master thread 125A to perform conflict analysis more efficiently. As described earlier, in some embodiments code generator 102 may be configured to generate different compiled versions of the same method for master threads and slave threads, and the decision as to which version is executed may be made at run time based on whether a particular modifying thread 125 succeeds or fails in acquiring lock 170.

A slave thread 125B, like a read-only thread 125C, may receive a termination/retry request or signal from a master 125A at any point during the time that the slave thread is a registered reader in some embodiments, e.g., as the master thread performs operations corresponding to block 414 of FIG. 4a. If such a request or signal is received (block 454), the slave thread's high-level operation fails (block 466), and the slave thread may retry the high-level operation in some embodiments. As in the case of read-only threads, in some embodiments the master thread may actively terminate the slave thread, while in other embodiments the master thread may request that the slave thread unregister itself. In one embodiment, if a particular slave thread fails to successfully complete a high-level operation despite several attempts, the slave thread may enter a "master-only" mode of operation in which it simply blocks when a lock attempt fails. In another embodiment, a master-only thread may be given a privileged status, e.g., by boosting its priority to ensure that it acquires the lock 170 in preference to other competing modifying threads that have not failed as often, and as a result may complete its high-level operation successfully.

If no termination/retry signals or requests are received by the slave thread 125B, the slave thread 125B may eventually unregister itself as a reader of shared data block 105 (block 456) and wait for a notification (block 460) from the master thread 125A indicating whether the slave's logged request 167 was accepted or rejected. After the master thread 125A completes its conflict analysis for the slave thread 125B (e.g., after the master performs the operations corresponding to block 426 of FIG. 4a), the master thread 125A sends a success/failure notification to the slave thread 125B. If the received notification indicates success (as detected in block 462 of FIG. 4c), the slave thread 125B successfully completes its high-level operation (block 464), and proceeds to any other high-level operations it may need to execute. If the received notification indicates that the slave thread's request 167 was rejected by the master, the slave thread's high-level operation fails (block 466) and in some embodiments the slave thread may retry the operation. In one embodiment, if at the time that a slave thread attempts to unregister as a reader, there is no current master thread (i.e., the last master has completed its high-level operation and no other thread has acquired the lock), the slave thread may be configured to acquire the lock and retry its data access operations (e.g., because there is no master to determine whether the unregistering slave's request is acceptable or not).

It is noted that, in the embodiments depicted in FIG. 4a-4c, a thread may in general fail in one of two ways when executing a high-level operation that uses the log synchronizer mechanism (except for self-induced terminations). First, a slave thread may fail if its read memory accesses overlap with writes executed by a master (where the writes may be executed either on behalf of the master itself or on behalf of a slave by the master). Second, a slave or a read-only thread may fail when a new session begins and the thread is signaled or requested to terminate by a master before the master begins modifying the currently-modifiable version of the shared data object. In both cases, the thread failures may be handled using a variety of techniques: e.g., by automatically retrying the failed high-level, or by raising an exception and leaving retries to the programmer. It is also noted that master threads are not failed or terminated in the embodiment of the log synchronizer mechanism shown in FIG. 4a-FIG. 4c, and that master status thus may represent a guarantee of progress for a modifying thread.

Figure 5:
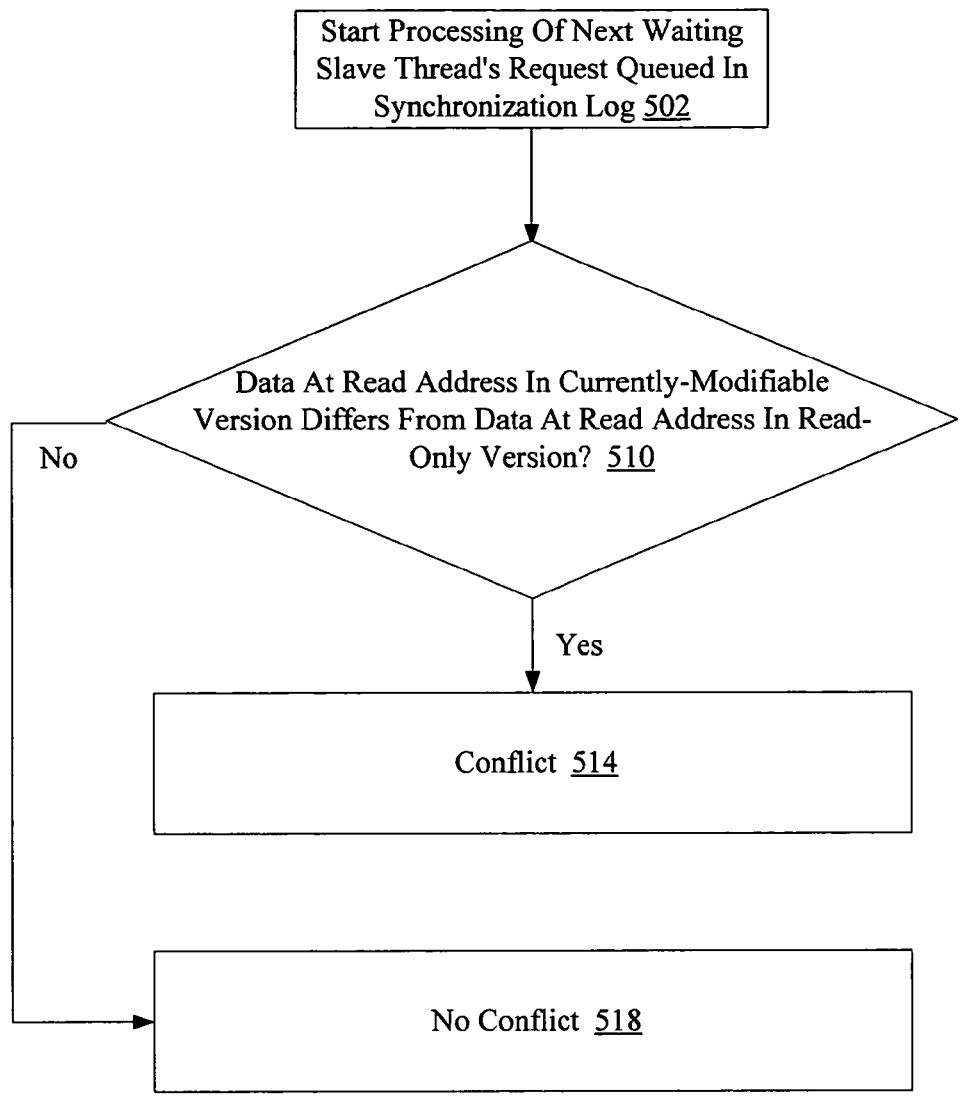
FIG. 5 is a flow diagram illustrating aspects of the operation of a master thread during the processing of a queued slave thread request, according to one embodiment.

As indicated in block 426 of FIG. 4a, the master thread 125A may be configured to determine, for each waiting slave thread's request 167, whether the request conflicts with an earlier write and should be rejected, or whether the request should be accepted and its logged modifications applied to the currently modifiable version of the shared data object. FIG. 5 is a flow diagram illustrating aspects of the operation of master thread 125A during the processing of a queued slave thread request, according to one embodiment. The master thread may access synchronization log 125A and begin processing a selected queued slave request 167 (block 502) for conflict analysis. The master thread may be configured to examine the read addresses (e.g., addresses to which load operations were directed from the slave thread) of the slave request. If data at a read address in a read-only version differs from the data in a writeable version, indicating that the read address matches or overlaps with an address that was written to by the master thread in the current session, either while executing the master thread's code or on behalf of an earlier-processed slave request 167 (decision block 510), the selected slave request 167 may be determined to be conflicting (block 514). Otherwise, the selected slave request may be determined to be conflict-free (block 518), and its modifications may be applied by the master to the currently-modifiable version (e.g., version "A" in an A-Session). It is noted that when examining read and write addresses, the master may consider the addresses of each of the two or more copies of a given field (e.g., copy 110B and 110C) of shared data object 105 to be equivalent in some embodiments: e.g., if a slave thread reads copy 2 of field 110B (version "B"), and the master previously wrote copy 1 of field 110B (version "A"), the slave read would be considered to be conflicting with the master write. In some embodiments, the master may compare logged read and write addresses to determine conflicts, instead of comparing the values at the read addresses in the different versions.

In some embodiments, the master thread may analyze queued slave requests 167 in the order in which the requests were initially queued within synchronization log 150. Since the read addresses are compared to the cumulative set of write operations performed up to that time by the master thread on behalf of itself and earlier-queued slave requests, slave threads that queued their requests earlier may in general have a higher probability of being accepted than slave threads that queued their requests later within a given session in such an embodiment. In other embodiments, requests may not be processed in chronological order: instead, for example, they may be processed in thread priority order, in the order in which the slave threads unregistered, or in some other order. In one implementation, each slave thread's read addresses may be compared to the write addresses for all the currently queued slave thread requests as well as the master's own write addresses, and the slave thread may be deemed to be conflicting if its read addresses match or overlap with any of the writes.

In some embodiments the master thread 125A may be configured to operate on a snapshot or frozen version of the synchronization log when performing slave request conflict analysis. For example, the set of slave requests that the master is to consider may include only those whose corresponding slave threads have unregistered at the time that the master thread completes its master code (e.g., at the time that the master completes the operations corresponding to block 420 of FIG. 4a). In one such embodiment, if a slave attempts to unregister at a time at which there is no master thread, the slave may be promoted to master status and may retry its operations. In another embodiment, the log synchronizer mechanism may prevent any currently registered slave threads from unregistering between the time that a master completes its own code (e.g., the operations in block 420 of FIG. 4a) and the time that the next master session begins.

Figure 6:
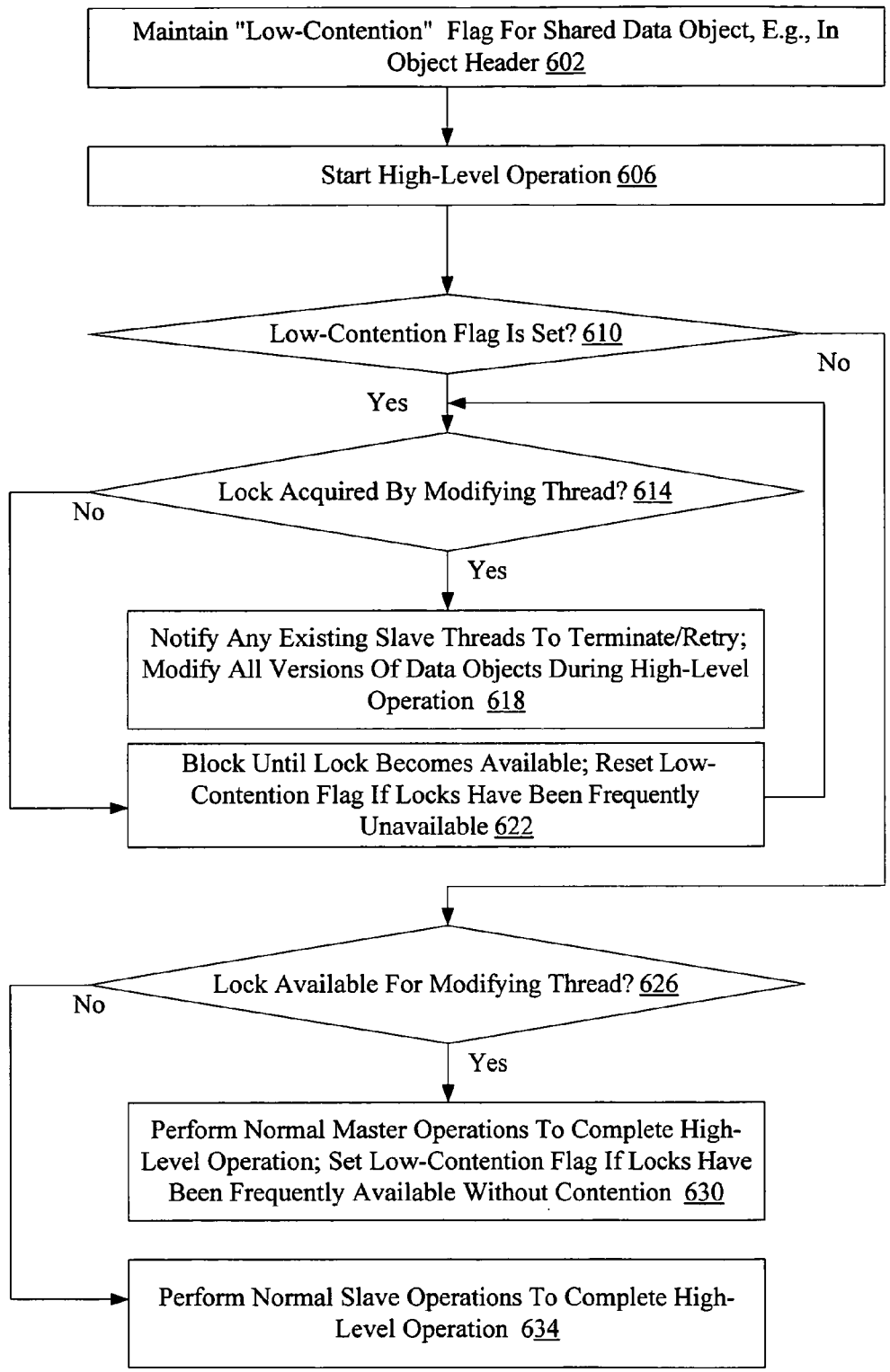
FIG. 6 is a flow diagram illustrating aspects of the operation of the log synchronizer mechanism in an embodiment in which the log synchronizer mechanism switches to a special mode of operation when low levels of contention are detected.

In one embodiment, the log synchronizer mechanism may be configured to adapt to changing contention levels. For example, when contention is low, the most efficient method-level concurrency control mechanism may in general be a monitor mechanism (similar to the monitor mechanisms supported in programming languages such as Java™). Accordingly, the log synchronizer mechanism may adapt to low contention levels by implementing a monitor-like "fast path" mechanism. FIG. 6 is a flow diagram illustrating aspects of the operation of the log synchronizer mechanism in an embodiment in which the log synchronizer mechanism switches to a special mode of operation when low levels of contention are detected. During periods of low contention in the depicted embodiment, no threads may be allowed to operate as slave threads, thus simplifying the code of the master thread.

As shown in block 602 of FIG. 6, a low-contention flag may be maintained for a shared data object 105, e.g., within a header of the shared data object. Low contention may be detected using a variety of techniques in different embodiments, e.g., by gathering short term statistics of lock acquisition attempts. When threads consistently succeed in gaining lock ownership for an object 105, they may set the global (per shared data object) low contention flag. Conversely, when threads consistently fail to acquire the lock for an object 105, and the low contention flag is set, they may reset the low contention flag.

When a modifying thread enters a high-level operation (block 606 of FIG. 6), it attempts to acquire the corresponding lock 170. If the low contention flag is set (as determined in block 610) and the thread acquires the lock (block 614), the lock owning thread may be configured to terminate any active slave threads and modify all the versions of the shared data object 105 during the high-level operation (block 618). Thus, in the fast-path mechanism illustrated in FIG. 6, if two versions "A" and "B" of the shared data object 105 are maintained, the lock owner stores are applied to both versions, and no logging is performed. Only a single additional store instruction may therefore be required for each original store instruction in the lock owner code. Furthermore, in embodiments where the copies of a given shared field 110 are cache-aligned, the additional store may usually be performed without incurring a cache miss, thus further reducing the overhead related to concurrency management. Since there are no slave threads, the master need not process any slave requests, and may only execute only its own code. However, the master must update all copies of shared fields 110 to support possible future high-contention periods.

If the low contention flag is set and the thread fails to acquire the lock, the thread may block (as in a traditional monitor or lock mechanism) until the lock becomes available (block 622). If lock attempts frequently fail, the blocked thread may eventually reset the low contention flag to indicate that contention is no longer low. If the low contention flag is not set, the normal master and slave operations may be performed (blocks 626, 630 and 634) as described above. If lock acquisitions are found to be consistently successful, a master thread may eventually set the low contention flag. The definition of "low contention" may be configurable in some embodiments: e.g., in one embodiment, a configuration parameter may be used to specify that the low contention flag should be set if no lock acquisition requests have failed for the last five minutes on a particular object 105, and another configuration parameter may be used to specify that if a thread blocks on three consecutive attempts to acquire a lock 170, the low contention flag should be reset if it is currently set.

In several of the embodiments described above, two versions "A" and "B" of shared data object 105 are maintained. If a master thread waits for current registered readers to complete (e.g., in operations corresponding to block 414 of FIG. 4a) instead of terminating the readers, performance along a critical execution path may be affected. In some embodiments, it may be possible to reduce the time spent waiting by having each shared field 110 (e.g., fields 110B and 110C) associated with more than two copies, instead of maintaining just two copies. For example, in one embodiment, three copies may be maintained, corresponding to versions "A", "B" and "C" of shared data object 105, and three corresponding types of master sessions (A-Sessions, B-Sessions and C-Session) may be implemented. In such an embodiment, an A-Session may be followed by a B-Session, a B-Session by a C-Session, and a C-Session by an A-Session. In an A-Session, a master may write to the "A" version, while slaves read from the "C" version. Any slaves that remain from the previous C-Session may still be reading from version "B", and any slaves that remain from the B-Session prior to that C-Session may still be reading from version "A". The master may only need to wait for these latter slaves that are still reading from version "A" (i.e., slaves that were active two sessions ago). The number of such two-session-old slaves may typically be small compared to one-session-old slaves in some embodiments, thus leading to a shorter waiting period for the master. Maintaining three (or more) versions of shared data object 105 instead of two versions may require more processing as well as more memory: e.g., the multiple copies of shared fields may require additional space (even though they may still all fit in the same cache line in some embodiments). Additionally, each store may have to be executed three times, since the master thread applies stores from the preceding two sessions on the current writeable version of the shared data object 105. Finally, in some embodiments, code generator 102 may have to prepare three or more versions of code for a high-level operation (e.g., one version each for the three or more types of sessions). However, despite the additional overhead, the reduction in waiting time for master threads may be sufficient to justify a three-version implementation (or an implementation with more than three versions) of the log synchronizer mechanism in one embodiment.

In some embodiments, log synchronization as described above may be used as a low overhead fallback mechanism for hardware transactional memory (HTM) mechanisms. In HTM, the instruction set of a machine may be extended with several specialized memory access instructions that are used instead of regular loads and stores to allow batching of instruction sequences into atomically executed transactions. Unfortunately, at least for the near future, HTM mechanisms are generally expected to only be able to support relatively short-lived transactions. A number of mechanisms, including software transactional memory mechanisms, have been proposed as fallback mechanisms in case an attempted transaction is too long to be executed fully in hardware. If HTM is combined with programming language extensions described above (e.g., the "logsynchronized" and "shared" modifiers for methods and fields respectively), the log synchronizer mechanism may be used as a fallback mechanism for HTM in some embodiments. A transaction may be made implicit in such an embodiment by embedding it in a class method declared by some modifying keyword (e.g., "logsynchronized"), and replacing at compile time loads and stores of "shared" fields with their HTM equivalents. Transaction initiation and finalization code may be inserted at the beginning and end of the method, respectively. A failed transaction may have a similar effect as a failed log-synchronized operation, depending on the implementation, e.g., an automatic retry of a method or a raising of an exception.

In such embodiments, log synchronization may provide a low overhead fallback mechanism for HTM. To allow HTM to work side-by-side with log synchronization, e.g. in an embodiment where two copies of shared fields 110 are maintained, HTM transactions may update both copies of shared copies they modify, thus keeping the two sets of values identical. The cost of the additional store may be insignificant, especially if the two copies are adjacent in memory, thus making cache misses unlikely. In some embodiments, a special status word may be associated with each object transacted on. Hardware transactions may implicitly test this word to see if its state has changed from neutral (i.e., not used or transactional) to log-synchronized, a change which would cause the transaction to abort. In Java™, for example, a multi-use-word which controls the object's monitor or log-synchronizer lock state may be a good candidate status word. Normally, all threads may execute the transactional code, and only when a transaction fails, the failed thread may try to acquire the log-synchronizer lock, changing the status word in the process. The status change may cause all current hardware transactions to abort, and the corresponding threads to restart as masters or slaves. When the log-synchronization lock is no longer requested, all threads may return to normal, i.e., they may start executing hardware transactional code again. It is noted that in this scheme, hardware transactions may only read the status word, and as long as the shared data object does not enter log-synchronized mode, hardware transactions may not fail if the other locations they access are disjoint. Thus the log synchronizer mechanism may co-exist with, and support long transactions for, HTM in some embodiments.

A number of optimizations to the basic log-synchronization mechanism illustrated in FIG. 4*a*-FIG. 4*c* may be implemented in various embodiments. For example, in the basic log-synchronizer mechanism, threads acting as slaves may behave "unnaturally" in one specific scenario: when within a log synchronized method, a modification to a shared field 110 is logged, and then the shared field is subsequently read from. The read in this case will return the old value. This anomaly results from the fact that during its execution, the slave thread reads the value of the shared field 110 from memory (e.g., from the "B" version in an A-Session), while the new logged value of the shared field 110 has yet to be applied by the master. In one embodiment, a solution to this anomaly may be provided by having the slave read the new value it has logged. In order to support this "write-then-read" case, the augmentation of loads and stores may be enhanced to utilize a local Bloom filter to monitor self-written addresses. A Bloom filter is a probabilistic bit vector used to test whether or not an element is in a set; Bloom filters may allow false positives. When a slave logs a store instruction, it generates a hash value of the address (e.g., it applies a hash function to the address) and sets a corresponding bit in the Bloom filter. Each read operation from a shared field is also accompanied by a quick lookup in the filter, and if the lookup indicates that the shared field was modified earlier by the slave, the written address set may be scanned in search for the latest value. In some embodiments, the written address set may be scanned in reverse order, from the latest change to the earliest, so that the latest updated value is read first in case of multiple updates. The filter may be implemented so that it fits into a single cache line and can be accessed by a single thread in some implementations; in such an implementation, the search of the Bloom filter may be a relatively low-overhead operation.

In another embodiment, the basic log-synchronizer mechanism may be enhanced to detect conflicts early, instead of, for example, waiting for a master thread to detect a conflict. In one such embodiment, a slave thread may be configured to detect a conflict before the slave thread completes its own code for a log-synchronized method. On each read of a shared field, in an implementation where two copies of shared fields 110 are maintained, for example, the slave thread may be configured to compare the values of the two copies of the field being read. If the two values are not equal (indicating that the master has modified the field during the current session), the request of the slave will eventually be rejected by the master, so the slave may be configured to terminate itself. This early detection mechanism may cost an additional load from the second copy, a compare, and branch. (The additional load is likely to be a cache hit in embodiments where the copies are cache-aligned.) The additional loads, compares and branches may be acceptable, however, since early detection may reduce the work of the master (and work done by the slave that may be "wasted" when the slave is eventually terminated).

The log-synchronizer mechanism may be enhanced to implement a hybrid approach to identify and terminate active slave and/or read-only reader threads (e.g., using an inter-thread signaling mechanism) at the beginning of each session in one embodiment. As described earlier, in some embodiments, a reader registration mechanism may be implemented using a global registration data structure; however, access to the registration data structure may itself have to be coordinated. If a registration mechanism is not implemented, all active non-master threads may have to be signaled in a naïve implementation. In one embodiment, a linked list of elements may be maintained instead, one element for each potentially active thread. Each element may include the corresponding thread's identifier, creation time, "active" and "removed" flags. Before reading from the shared data object 105, a thread may check whether its element is in the list by inspecting the "removed" flag. If the element has the "removed" flag set, the thread may allocate a new element and inserts it at the beginning of the linked list, e.g., using a compare and swap (CAS) instruction. The "active" flag may be set, indicating that the thread is reading, and may be reset after the thread completes reading the shared data object 105. The master may send termination signals to the threads whose elements in the linked list have their "active" flags set. Elements may be removed from the list by the master thread, e.g., after the thread age is above a threshold value. By keeping inactive threads' elements in the list, the cost of coordinating access to the list may be reduced, and by removing elements of "old" threads, the list size may be kept proportional to the number of active reading threads.

Figure 7:
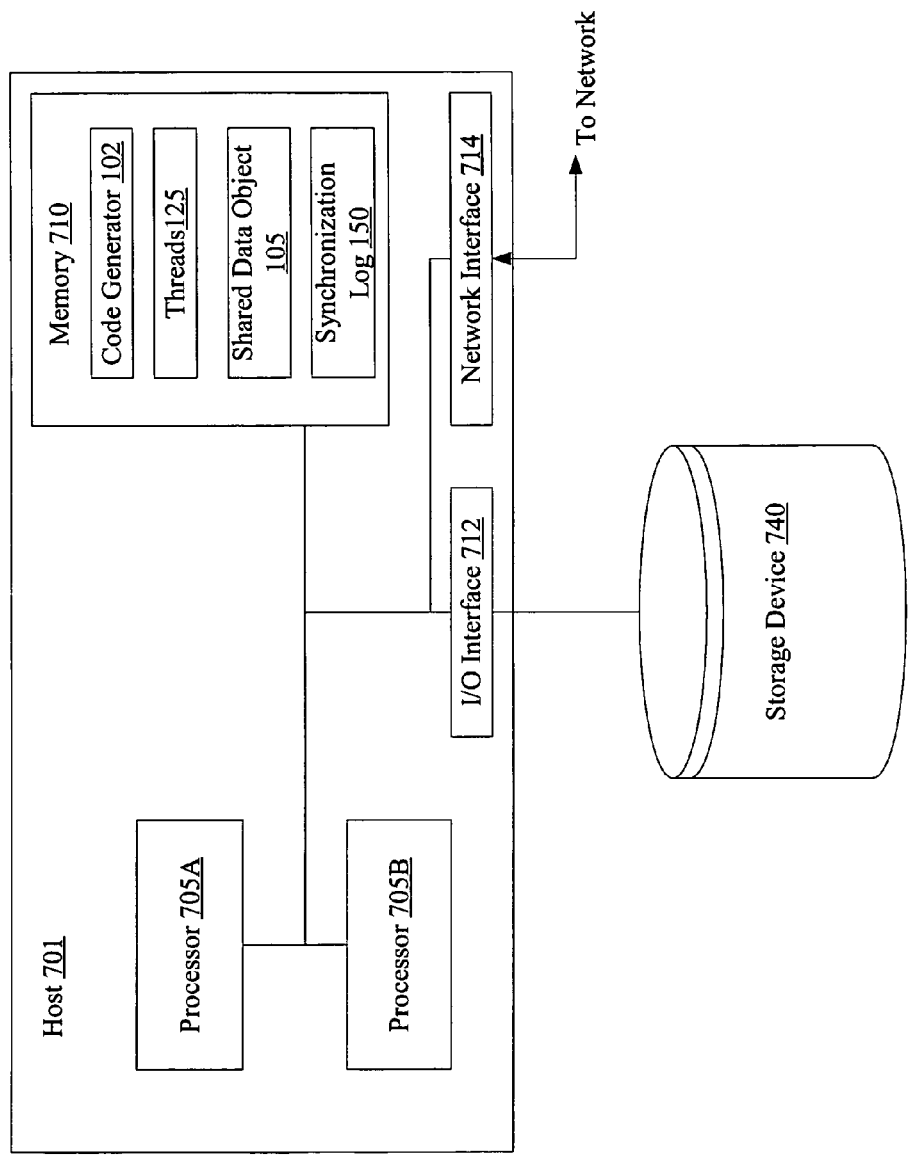
FIG. 7 is a block diagram illustrating a computer host according to one embodiment.

FIG. 7 is a block diagram illustrating a computer host 701, according to one embodiment. Host 701 may comprise one or more processors 705 (e.g., 705A and 705B), which may be implemented using any desired architecture or chip set, such as the SPARC™ architecture from Sun Microsystems or the x86-compatible architectures from Intel Corporation, Advanced Micro Devices, etc. Program instructions that may be executable to implement the functionality of code generator 102, threads 125 and to maintain synchronization logs 150 for shared data objects 105 may be partly or fully resident within a memory 710 at a given point in time, and may also be stored on a storage device 740. In some embodiments, code generator 102 may be included within a virtual machine process (such as a Java™ virtual machine (JVM)) in memory 702 at which an application that defines a shared data object 105 is executed and at which threads 125 run. Code generator 102 may be a compiler (e.g., a Just-In-Time or JIT compiler) in some embodiments, and a byte-code interpreter in other embodiments. In various embodiments, threads 125 may implement any type of individual or standalone application (e.g., a database application or a scientific simulation application), an instance or component of a distributed application, etc. Memory 710 may be implemented using any appropriate medium such as any of various types of RAM (e.g., DRAM, SDRAM, RDRAM, SRAM, etc.). In addition to processors 705 and memory 710, host 701 may also include one or more I/O interfaces 712 providing access to storage devices, one or more network interfaces 714 providing access to a network and the like. Any of a variety of storage devices may be used to store the instructions as well as data (e.g., for code generator 102 and threads 125) in different embodiments, include any desired type of persistent and/or volatile storage devices, such as individual disks, disk arrays, optical devices such as CD-ROMs, CD-RW drives, DVD-ROMs, DVD-RW drives, flash memory devices, various types of RAM and the like.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
two or more of a plurality of threads executing on one or more processors concurrently accessing a shared data object during a data access session, wherein a data access session comprises a set of access operations performed on the shared data object by a given one of the two or more threads that has acquired master status during the period of time in which the given one of the two or more threads acts as a master thread with respect to access operations targeting the shared data object, and wherein the given one of the two or more threads acts as the master thread for the duration of the data access session;
wherein concurrently accessing the shared data object during the data access session comprises:
the given one of the two or more threads performing one or more data modifications on a first version of the shared data object;
the given one of the two or more threads performing one or more data modifications of a thread of the two or more threads other than the given one of the two or more threads that target the shared data object on the first version of the shared data object; and
a thread of the two or more threads other than the given one of the two or more threads performing one or more read accesses that target the shared data object in a non-blocking manner on a second version of the shared data object;
wherein the method further comprises:
the given one of the two or more threads ending the data access session; and
the given one of the two or more threads making the first version of the shared data object and the second version of the shared data object identical.

2. The method as recited in claim 1, further comprising:
prior to ending the data access session, the given one of the two or more threads determining if any read accesses performed on the second version are in conflict with any data modifications performed on the first version; and
the given one of the two or more threads resolving any conflicts found.

3. The method as recited in claim 2, wherein the shared data object comprises a plurality of addressable data locations, wherein data accesses to the shared data object are performed at an address level, and wherein said conflicts are determined at the address level.

4. The method as recited in claim 1, further comprising:
one of the plurality of threads other than the given one of the two or more threads becoming a master thread for a subsequent session during which two or more of the plurality of threads concurrently access the shared data object, wherein said concurrently accessing the shared data object during the subsequent session comprises:
the master thread for the subsequent session performing one or more data modifications of one or more of the two or more threads concurrently accessing the shared data object during the subsequent session other than the master thread for the subsequent session on the second version of the shared data object; and
a thread of the two or more threads concurrently accessing the shared data object during the subsequent session other than the master thread for the subsequent session performing read accesses to the shared data object in a non-blocking manner on the first version of the shared data object.

5. The method as recited in claim 1, wherein the shared data object is one of a plurality of data objects comprised within a data structure, the method further comprising:
two or more of the plurality of threads concurrently accessing another one of the plurality of data objects during an other session, wherein the other session overlaps at least partly with said data access session, wherein a given thread among the plurality of threads other than the given one of the two or more threads is the corresponding master thread during the other session for accessing the other data object, and wherein said accessing the other data object during the other session comprises:
the corresponding master thread performing one or more data modifications of a thread of the two or more threads accessing the other data object other than the corresponding master thread on a first version of the other data object; and
a thread of the two or more threads accessing the other data object other than the corresponding master thread performing read accesses to the other data object in a non-blocking manner on a second version of the other data object.

6. The method as recited in claim 5, wherein the data structure is an instance of an object class defined in an application program, wherein each of the plurality of data objects comprises one or more member fields of the instance of the object class.

7. A system, comprising:
a processor; and
memory coupled to the processor, wherein the memory stores program instructions executable by the processor to cause the processor to perform:
two or more of a plurality of threads concurrently access a shared data object during a data access session, wherein a data access session comprises a set of access operations performed on the shared data object by a given one of the two or more threads that has acquired master status during the period of time in which the given one of the two or more threads acts as a master thread with respect to access operations targeting the shared data object, and wherein the given one of the two or more threads acts as the master thread for the duration of the data access session;
wherein concurrently accessing the shared data object during the data access session comprises:
the given one of the two or more threads performing one or more data modifications on a first version of the shared data object;
the given one of the two or more threads performing one or more data modifications of a thread of the two or more threads other than the given one of the two or more threads that target the shared data object on the first version of the shared data object; and
a thread of the two or more threads other than the given one of the two or more threads performing one or more read accesses that target the shared data object in a non-blocking manner on a second version of the shared data object;
wherein the program instructions are further executable by the processor to cause the processor to perform:
the given one of the two or more threads ending the data access session; and
the given one of the two or more threads making the first version of the shared data object and the second version of the shared data object identical.

8. The system as recited in claim 7, wherein the program instructions are further executable by the processor to cause the processor to perform:
prior to ending the data access session, the given one of the two or more threads determining if any read accesses performed on the second version of the shared data object are in conflict with any data modifications performed on the first version of the shared data object; and
the given one of the two or more threads resolving any conflicts found.

9. A non-transitory computer readable storage medium storing program instructions that when executed on one or more computers cause the one or more computers to perform:
two or more of a plurality of threads concurrently accessing a shared data object during a data access session, wherein a data access session comprises a set of access operations performed on the shared data object by a given one of the two or more threads that has acquired master status during the period of time in which the given one of the two or more threads acts as a master thread with respect to access operations targeting the shared data object, and wherein the given one of the two or more threads acts as the master thread for the duration of the data access session;
wherein concurrently accessing the shared data object during the data access session comprises:
the given one of the two or more threads performing one or more data modifications on a first version of the shared data object;
the given one of the two or more threads performing one or more data modifications of a thread of the two or more threads other than the given one of the two or more threads that target the shared data object on the first version of the shared data object; and
a thread of the two or more threads other than the given one of the two or more threads performing one or more read accesses that target the shared data object in a non-blocking manner on a second version of the shared data object;
wherein executing the program instructions on the one or more computers further causes the one or more computers perform:
the given one of the two or more threads ending the data access session; and
the given one of the two or more threads making the first version of the shared data object and the second version of the shared data object identical.

10. The non-transitory computer readable storage medium as recited in claim 9, wherein executing the program instructions on the one or more computers further causes the one or more computers perform:
prior to ending the data access session, the given one of the two or more threads determining if any read accesses performed on the second version are in conflict with any data modifications performed on the first version; and
the given one of the two or more threads resolving any conflicts found.

11. A computer-implemented method, comprising:
a plurality of threads executing on one or more processors concurrently accessing a shared data object during a data access session, wherein a data access session comprises a set of access operations performed on the shared data object by a given one of the plurality of threads that has acquired master thread status during the period of time in which the given one of the plurality of threads is a master thread with respect to access operations targeting the shared data object, wherein the given one of the threads is the master thread for the duration of the data access session;
wherein, during the data access session, said accessing comprises:
one or more of the threads performing read accesses on the shared data object in a non-blocking manner;

the master thread performing one or more data modifications of a thread of the plurality of threads other than the master thread that target the shared data object; and the master thread determining if any read accesses are in conflict with any data modifications to the shared data object and resolving any conflicts; and during a subsequent session for accessing the shared data object, a given one of the plurality of threads other than the master thread becoming a master thread for the subsequent session.

12. The method as recited in claim 11, wherein the one or more data modifications are performed by the master thread on a first version of the shared data object during the data access session, wherein non-blocking read accesses by threads other than the master thread are performed on a second version of the shared data object during the data access session, wherein the second version of the shared data object remains unmodified during the data access session, and wherein the method further comprises, after the data access session ends, updating the second version of the shared data object to reflect modifications made to the first version of the shared data object during the data access session.

13. The method as recited in claim 11, wherein the shared data object comprises a member field of a parent object comprising a plurality of member fields, the method further comprising:

two or more threads of the plurality of threads concurrently accessing an other member field of the parent object during an other session that overlaps at least partly in time with the data access session, wherein a given thread other than the master thread is designated as a master thread for the other session, and wherein, during the other session, said concurrently accessing the other member field comprises:

one or more of the two or more threads accessing the other member field performing read accesses on the other member field in a non-blocking manner;

the master thread for the other session performing one or more data modifications to the other member field of one or more of the two or more threads accessing the other member field other than the master thread for the other session that target the other member field; and the master thread for the other session determining if any read accesses are in conflict with any data modifications to the other member field and resolving any conflicts.

14. The method as recited in claim 11, further comprising:

a modifying thread other than the master thread logging one or more data modifications directed to the shared data object during the data access session to a log;

wherein, in performing data modifications of the modifying thread, the master thread accesses the log.

15. A system, comprising:

a processor; and memory coupled to the processor, wherein the memory stores program instructions executable by the processor to cause the processor to perform:

a plurality of threads accessing a shared data object during a data access session, wherein a data access session comprises a set of access operations performed on the shared data object by a given one of the plurality of threads designated as a master thread during the period of time in which the given one of the plurality of threads is designated as the master thread with respect to access operations targeting the shared data object, wherein the given one of the threads is designated as the master thread for the duration of the data access session;

wherein said accessing the shared data object during the data access session comprises:

one or more of the threads performing read accesses on the shared data object in a non-blocking manner;

the given one of the threads designated as the master thread performing one or more data modifications of a thread other than the given one of the threads designated as the master thread that target the shared data object; and the given one of the threads designated as the master thread determining if any read accesses are in conflict with any data modifications to the shared data object and resolving any conflicts; and during a subsequent session for accessing the shared data object, a given one of the plurality of threads other than the given one of the threads designated as the master thread being designated as a master thread for the subsequent session.

16. The system as recited in claim 15, wherein the one or more data modifications are performed by the given one of the threads designated as the master thread for the data access session on a first version of the shared data object during the data access session, wherein non-blocking read accesses by threads other than the given one of the threads designated as the master thread for the data access session are performed on a second version of the shared data object during the data access session, wherein the second version of the shared data object remains unmodified during the data access session, and wherein the program instructions are further executable by the processor to cause the processor to perform, after the data access session ends, updating the second version of the shared data object to reflect modifications made to the first version of the shared data object during the data access session.

17. The system as recited in claim 15, wherein the plurality of threads are executed within a single virtual machine process at a single computer host.

18. A non-transitory computer readable storage medium storing program instructions that when executed on one or more computers cause the one or more computers to perform:

a plurality of threads accessing a shared data object during a data access session, wherein a data access session comprises a set of access operations performed on the shared data object by a given one of the plurality of threads designated as a master thread during the period of time in which the given one of the plurality of threads acts is designated as a master thread with respect to access operations targeting the shared data object, and wherein the given one of the threads is designated as the master thread for the duration of the data access session;

wherein said accessing the shared data object during the data access session comprises:

one or more of the threads performing read accesses on the shared data object in a non-blocking manner;

the given one of the threads designated as the master thread performing one or more data modifications of a thread other than the given one of the threads designated as the master thread that target the shared data object; and the given one of the threads designated as the master thread determining if any read accesses are in conflict with any data modifications to the shared data object and resolving any conflicts; and during a subsequent session for accessing the shared data object, a given one of the plurality of threads other than the given one of the threads designated as the master thread being designated as a master thread for the subsequent session.

19. The non-transitory computer readable storage medium as recited in claim 18, wherein the modifications are performed by the given one of the thread designated as the master thread for the data access session on a first version of the shared data object during the data access session, wherein non-blocking read accesses by threads other than the given one of the thread designated as the master thread for the data access session are performed on a second version of the shared data object during the data access session, wherein the second version of the shared data object remains unmodified during the data access session, and wherein executing the program instructions further causes the one or more computers to perform, after the data access session ends, updating the second version of the shared data object to reflect modifications made to the first version of the shared data object during the data access session.

20. The non-transitory computer readable storage medium as recited in claim 19, wherein each access to the shared data object by the plurality of threads comprises a virtual memory address specifying a targeted data location within the shared data object.

* * * * *